United States Patent
Francis et al.

(10) Patent No.: US 11,169,044 B1
(45) Date of Patent: Nov. 9, 2021

(54) HARDENING ANNULUS SEAL TEST HEAD SYSTEMS AND METHODS

(71) Applicant: Trinity Bay Equipment Holdings, LLC, Houston, TX (US)

(72) Inventors: Kirk Spencer Francis, Richmond, TX (US); John Paul Leger, Baytown, TX (US); Ashesh Srivastava, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 17/199,770

(22) Filed: Mar. 12, 2021

(51) Int. Cl.
| | |
|---|---|
| *G01M 3/20* | (2006.01) |
| *G01M 3/22* | (2006.01) |
| *F16L 55/07* | (2006.01) |
| *G01M 3/28* | (2006.01) |

(52) U.S. Cl.
CPC ............ *G01M 3/20* (2013.01); *F16L 55/07* (2013.01); *G01M 3/2815* (2013.01)

(58) Field of Classification Search
CPC .. G01M 3/00; G01M 3/18–28; G01M 3/2815; F16L 9/18; F16L 11/20; F16L 55/07
See application file for complete search history.

(56) References Cited

U.S. PATENT DOCUMENTS

| | | | |
|---|---|---|---|
| 2008/0072659 A1* | 3/2008 | Adams | G01M 3/22 73/49.2 |
| 2010/0018599 A1* | 1/2010 | Ferrer | F16L 39/005 138/112 |
| 2010/0068986 A1* | 3/2010 | Eccleston | G01M 3/283 454/339 |
| 2015/0068288 A1* | 3/2015 | Gaudet | G01M 3/22 73/40.7 |
| 2017/0145808 A1* | 5/2017 | Amundsen | E21B 17/01 |
| 2017/0219455 A1* | 8/2017 | Mangal | G01M 3/2815 |
| 2018/0231168 A1* | 8/2018 | Barnes | G01M 3/2815 |
| 2019/0352974 A1* | 11/2019 | Dennett | G01M 3/24 |

FOREIGN PATENT DOCUMENTS

GB 875224 A * 8/1961 ............... F16L 9/20

* cited by examiner

*Primary Examiner* — Nguyen Q. Ha
(74) *Attorney, Agent, or Firm* — Conrad J. Hsu

(57) ABSTRACT

Techniques for implementing and/or operating a system, which includes a pipe segment and a test head assembly. The test head includes an end container, in which an end of tubing of the pipe segment is disposed within the end container, an annulus seal implemented at least in part by solidifying fluid hardening material that is flowed into the end container to facilitate securing the test head assembly to the pipe segment and sealing an opening end of a tubing annulus of the pipe segment within the test head assembly, and a fluid port fluidly connected to a fluid conduit defined within the tubing annulus of the pipe segment to enable integrity of the tubing to be tested at least in part by flowing a test fluid into the fluid conduit defined in the tubing annulus, extracting fluid from the fluid conduit defined in the tubing annulus, or both.

20 Claims, 8 Drawing Sheets

HARDENING ANNULUS SEAL TEST HEAD SYSTEMS AND METHODS

BACKGROUND

The present disclosure generally relates to pipeline systems and, more particularly, to a test head assembly that may be deployed at a pipe segment, which is or is to be deployed in a pipeline system, to facilitate determining an integrity state of the pipe segment.

Pipeline systems are often used to transport (e.g., convey) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, potable water, fresh water, fracturing fluid, flowback fluid, carbon dioxide, or any combination thereof.

To facilitate transporting fluid, a pipeline system may include one or more pipe segments in addition to pipe (e.g., midline and/or end) fittings, which are used to connect a pipe segment to another pipeline component, such as another pipe fitting, another pipe segment, a fluid source, and/or a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid (e.g., clean and/or potable water).

However, at least in some instances, the presence of one or more faults, such as a breach, a kink, and/or a dent, in the tubing of a pipe segment may affect (e.g., reduce and/or compromise) its integrity and, thus, its ability to provide isolation (e.g., insulation). In other words, at least in some instances, operating a pipeline system while a pipe segment deployed therein has an integrity compromising fault may affect (e.g., reduce) operational efficiency and/or operational reliability of the pipeline system, for example, due to the fault resulting in conveyed fluid being lost to and/or contaminated by external environmental conditions. As such, to facilitate improving pipeline operational efficiency and/or operational reliability, the integrity of one or more pipe segments deployed or to be deployed in a pipeline system may be tested, for example, before beginning and/or resuming normal operation of the pipeline system.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a system includes a pipe segment and a test head assembly secured to the pipe segment. The pipe segment includes tubing that defines a pipe bore through the pipe segment and a fluid conduit in a tubing annulus of the pipe segment. The test head includes an end container, in which an end of the tubing of the pipe segment is disposed within the end container, an annulus seal implemented at least in part by solidifying fluid hardening material that is flowed into the end container to facilitate securing the test head assembly to the pipe segment and sealing an opening end of the tubing annulus of the pipe segment within the test head assembly, and a fluid port fluidly connected to the fluid conduit defined within the tubing annulus of the pipe segment to enable integrity of the tubing to be tested at least in part by flowing a test fluid into the fluid conduit defined in the tubing annulus of the pipe segment via the fluid port, extracting fluid from the fluid conduit defined in the tubing annulus of the pipe segment via the fluid port, or both.

In another embodiment, a method of deploying a test head assembly at a pipe segment includes inserting an end of the pipe segment into an end container of the test head assembly via a tubing opening formed through a sidewall of the end container, flowing fluid hardening material into the end container of the test head assembly such that the fluid hardening material flows into a tubing annulus of the pipe segment, solidifying the fluid hardening material to implement a hardening material annulus seal that encases and is bonded to the end of the pipe segment to facilitate securing the test head assembly to the pipe segment and sealing an open end of the tubing annulus of the pipe segment within the test head assembly, and fluidly connecting a fluid port of the test head assembly to the tubing annulus of the pipe segment to enable integrity of the pipe segment to be tested at least in part by flowing a test fluid into the tubing annulus of the pipe segment via the fluid port, extracting fluid from the tubing annulus of the pipe segment via the fluid port, or both.

In another embodiment, a test head assembly includes an end container, in which the end container includes a sidewall with a tubing opening that enables an end of a pipe segment to be inserted into the end container and the end container enables fluid hardening material to be disposed therein to implement a hardening material annulus seal that facilitates securing the test head assembly to the pipe segment and sealing an open end of a tubing annulus of the pipe segment within the test head assembly. Additionally, the test head assembly includes a fluid port to be fluidly connected to the tubing annulus of the pipe segment to enable integrity of the pipe segment to be tested at least in part by flowing a test fluid into the tubing annulus of the pipe segment via the fluid port, extracting fluid from the tubing annulus of the pipe segment via the fluid port, or both.

DETAILED DESCRIPTION

Figure 1:
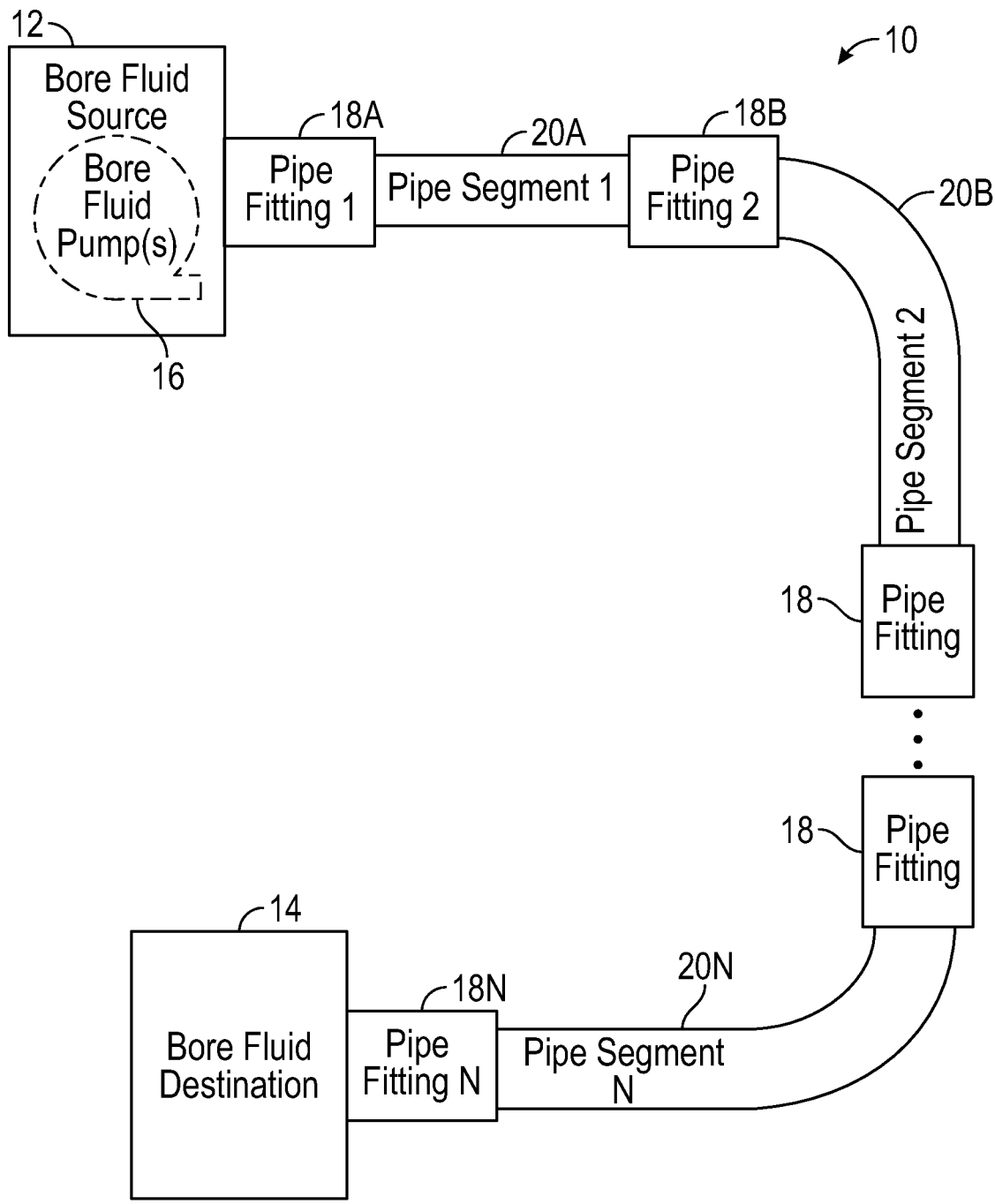
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings, such as a midline pipe fitting and/or a pipe end fitting, and one or more pipe segments. More specifically, a pipe segment may generally be secured and sealed in one or more pipe fittings to facilitate fluidly coupling the pipe segment to another pipeline component, such as another pipe segment, another pipe fitting, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, a pipe segment generally includes tubing that defines (e.g., encloses) a pipe bore, which provides a primary fluid conveyance (e.g., flow) path through the pipe segment. More specifically, the tubing of a pipe segment may be implemented to facilitate isolating environmental conditions external to the pipe segment from conditions within its pipe bore and, thus, fluid that flows therethrough. In particular, the tubing of a pipe segment may primarily be implemented to block fluid flow directly between the pipe bore of the pipe segment and its external environmental conditions, for example, in addition to providing thermal, pressure, and/or electrical isolation (e.g., insulation).

To facilitate providing fluid isolation, in some instances, the tubing of a pipe segment may be implemented with multiple tubing layers. For example, the tubing of a pipe segment may include an inner barrier (e.g., liner) layer and an outer barrier (e.g., shield or sheath) layer that each run (e.g., span) the length of the pipe segment. To facilitate blocking fluid flow directly therethrough, the inner barrier layer and the outer barrier layer may each be a continuous layer of solid material, such as plastic and/or a composite material, that runs the length of the pipe segment—although, at least in some instances, fluid from the pipe bore may nevertheless gradually permeate through the inner barrier layer and/or fluid from external environmental conditions may nevertheless gradually permeate through the outer barrier layer.

The tubing of a pipe segment may additionally include one or more intermediate layers implemented between its inner barrier layer and its outer barrier layer and, thus, in a tubing annulus of the pipe segment, for example, to facilitate improving tensile strength and/or hoop strength of the pipe segment tubing. Additionally, to facilitate improving deployment (e.g., installation) efficiency, in some instances, an intermediate layer of pipe segment tubing may include solid material, such as metal and/or a composite material, as well as free space (e.g., one or more gaps) devoid of solid material. For example, an intermediate layer may include solid material helically wrapped (e.g., wound) on an inner tubing (e.g., inner barrier and/or another intermediate) layer of the pipe segment tubing such that free space is left between adjacent solid strip wraps (e.g., windings). An outer tubing (e.g., outer barrier and/or another intermediate) layer may then be implemented over the intermediate layer to cover the free space.

In other words, in such instances, the tubing annulus of a pipe segment tubing may include free space (e.g., one or more gaps) in which solid material is not implemented. Due to the reduced amount of solid material, at least in some instances, implementing an intermediate layer of pipe segment tubing to include free space may facilitate improving flexibility of the tubing of the pipe segment, for example, to facilitate reducing its minimum bend radius (MBR). In fact, at least in some instances, a flexible pipe segment may be spooled (e.g., on a reel and/or in a coil) and, thus, increasing its flexibility may facilitate improving deployment efficiency, for example, by enabling the pipe segment to be transported and/or deployed using a tighter spool.

Nevertheless, in some instances, damage to the outer layer of the pipe segment tubing may affect (e.g., compromise and/or reduce) its integrity. For example, a breach in the outer layer of a pipe segment may result in excessive (e.g., undesired) fluid flow from the external environmental conditions directly into the pipe segment. In other words, at least in some instances, operating a pipeline system while pipe segment tubing deployed therein has integrity compromising damage (e.g., fault) may affect operational reliability of the pipeline system, for example, due to the breach resulting in contamination of the annulus of the pipe segment tubing by external environmental conditions.

As such, to facilitate improving operational reliability of a pipeline system, the integrity of one or more pipe segments deployed or to be deployed in the pipeline system may be tested, for example, via an integrity test performed by a testing system before beginning and/or resuming normal operation of the pipeline system. In fact, to facilitate testing pipe integrity, in some instances, free space within the tubing annulus of a pipe segment may run the length of the pipe segment, thereby providing one or more fluid conduits through which fluid can flow within the tubing annulus of the pipe segment. As such, the outer barrier layer of the pipe segment may isolate the free space in the tubing annulus of the pipe segment from environmental conditions external to the pipe segment while the inner barrier layer of the pipe segment may isolate the tubing annulus from the pipe bore of the pipe segment. In other words, in such instances, the pipe segment may enable fluid flow in its pipe bore as well as fluid flow in the annulus of its tubing.

Leveraging this fact, in some instances, a testing system may test the integrity of a pipe segment at least in part by injecting (e.g., supplying and/or pumping) test fluid into free space (e.g., one or more fluid conduits) defined within the tubing annulus of the pipe segment and determining one or more fluid parameters that result downstream due to the test fluid injection, for example, via one or more test fluid sources (e.g., pumps and/or compressed gas tanks) and one or more fluid parameter sensors, respectively. Merely as an illustrative non-limiting example, the one or more downstream fluid parameters may include a downstream fluid pressure determined by a pressure sensor. Additionally or alternatively, the one or more downstream fluid parameters may include a downstream fluid composition (e.g., constituent percentages) determined by a fluid composition sensor, a downstream fluid temperature determined (e.g., measured and/or sensed) by a temperature sensor, or both.

Furthermore, in some instances, the test fluid used in a testing system may be an inert fluid, such as nitrogen (e.g., $N_2$) gas, for example, to reduce the likelihood that the test fluid itself affects (e.g., compromises and/or corrodes) the integrity of a pipe segment being tested. Additionally or alternatively, in some instances, the test fluid may be compressed air. Moreover, in some instances, one or more fluid parameters of the test fluid may be pre-determined, for example, offline by a test lab and/or a fluid supplier. Additionally or alternatively, one or more fluid parameters of the test fluid may be determined while the test fluid is being supplied to the tubing annulus of a pipe segment, for example, online and/or in real-time via one or more fluid parameter sensors.

In other words, a fluid parameter of the test fluid may be an upstream fluid parameter and, thus, comparison with a corresponding downstream fluid parameter may indicate the change in the fluid parameter that results from fluid flow through free space defined within the tubing annulus of a pipe segment. As described above, the tubing of a pipe segment may generally be implemented to provide isolation, such as thermal isolation (e.g., insulation), fluid flow isolation, and/or pressure isolation, and, thus, to facilitate reducing the amount fluid parameters change due to fluid flow therein. Although some amount of change in a fluid parameter may nevertheless occur, the change may generally be predictable, for example, based at least in part on a model, empirical testing, external environmental conditions, fluid parameters of the injected test fluid, implementation parameters, such as material and/or thickness, of the pipe segment tubing, or any combination thereof.

In other words, at least in some instances, an unexpected change in a downstream fluid parameter may indicate that the integrity of a pipe segment is compromised by one or more faults, such as a dent, a kink, and/or a breach. For example, an unexpected change (e.g., drop) in downstream fluid pressure relative to pressure of injected test fluid may be indicative of fluid leaking from the tubing annulus of the pipe segment and, thus, that the outer barrier layer of the pipe segment is potentially compromised. Additionally, an unexpected change in downstream fluid composition relative to composition of injected test fluid may be indicative of conditions external to the tubing of the pipe segment contaminating fluid in the tubing annulus of the pipe segment and, thus, that the outer barrier layer of the pipe segment tubing is potentially compromised. In other words, efficacy (e.g., accuracy) of an integrity test for a pipe segment may be premised on free space (e.g., gaps and/or fluid conduits) defined in its tubing annulus being fluidly isolated from conditions external to the tubing of the pipe segment.

Accordingly, to facilitate testing pipe integrity, the present disclosure provides techniques for implementing and/or deploying a test head assembly of a testing system to facilitate sealing the open ends of the free space defined within the tubing annulus of a pipe segment while enabling test fluid to flow into and/or out from the free space defined within the tubing annulus of the pipe segment. As will be described in more detail below, to enable fluid flow into and/or out from the tubing annulus of a pipe segment, a test head assembly may generally include one or more fluid ports, which are each implemented to be fluidly connected to free space defined within the tubing annulus of the pipe segment. Additionally, to facilitate sealing the free space within the tubing annulus of a pipe segment, a test head assembly may generally include an annulus seal implemented using hardening material, such as epoxy.

To facilitate implementing a hardening material annulus seal, a test head assembly may additionally include an end container. In particular, the end container may generally include a tubing opening, which is implemented to enable an end of the tubing of a pipe segment to be inserted into the end container. After the pipe segment tubing has been inserted into the end container, fluid hardening material, such as liquid epoxy, may be flowed into the end container and, subsequently, solidified (e.g., cured and/or hardened) to implement a hardening material annulus seal that encases and is bonded to the pipe segment tubing, thereby securing the test head assembly to the pipe segment tubing as well as sealing (e.g., isolating) an open end of the annulus of the pipe segment tubing in the test head assembly from external environmental conditions and the pipe bore of the pipe segment.

To reduce the likelihood of fluid hardening material inadvertently leaking out therefrom, the end container of a test head assembly may generally include one or more container seals implemented around its tubing opening. Additionally, to improve securement strength, in some embodiments, pipe segment tubing may be scored (e.g., roughed up) or otherwise contoured before fluid hardening material is flowed therearound and, thus, before being inserted into a corresponding end container. Furthermore, to facilitate improving sealing integrity, in some embodiments, a hardening material annulus seal of a test head assembly may be implemented such that it partially extends into the tubing annulus of a corresponding pipe segment.

To facilitate implementing its hardening material annulus seal partially within the tubing annulus of a pipe segment, in some embodiments, a test head assembly may be deployed at least in part by injecting air into its end container behind fluid hardening material disposed within the end container. To facilitate injecting air therein, in some such embodiments, the end container may include a container lid with an injection port, for example, which may be connected to the rest of the end container once fluid hardening material has been disposed in the end container. Moreover, to facilitate checking the distance that fluid hardening material has traveled into the tubing annulus of a pipe segment, in some embodiments, a test head assembly may additionally include a depth check opening formed through the outer barrier layer of the pipe segment to the tubing annulus of the pipe segment. In this manner, in such embodiments, the supply of air and/or fluid hardening material into the end container may be ceased once fluid hardening material has reached the depth check opening.

Additionally, to facilitate blocking fluid hardening material from flowing into the pipe bore of a pipe segment, in some embodiments, a test head assembly may additionally include a (e.g., coned) bore plug. In particular, in such embodiments, the bore plug may be implemented to be inserted into the pipe bore of a pipe segment such that the outer surface of the bore plug engages the inner surface of the tubing of the pipe segment and, thus, facilitates sealing the pipe bore. However, in other embodiments, the end container of a test head assembly may be donut-shaped with a hollow core to facilitate blocking fluid hardening material from flowing into the pipe bore of a corresponding pipe segment.

In any case, as described above, a test head assembly may generally include a fluid port, which is implemented to be fluidly connected to free space defined with the tubing annulus of a pipe segment. In particular, in some embodiments, the fluid port may be fluidly connected to the tubing annulus via an annulus tube that extends through the hardening material annulus seal of the test head assembly, for example, and beyond a depth check opening formed in the pipe segment. In other words, in such embodiments, the annulus tube may be inserted into the tubing annulus of the pipe segment and, subsequently, fluid hardening material may be flowed around the annulus tube such that the annulus tube is embedded in a resulting hardening material annulus seal.

However, in other embodiments, a fluid port may be fluidly connected to the tubing annulus of a pipe segment via an annulus test opening, which is formed through the outer barrier layer of the pipe segment to the tubing annulus of the pipe segment, for example, such that the annulus test opening is located farther from the end container of the test head assembly than a depth check opening. To facilitate securing a fluid port over an annulus test opening formed in a pipe segment, in some such embodiments, the fluid port may be part of a saddle clamp. In particular, in such embodiments, the fluid port may be integrated with and extend through a clamp segment of the saddle clamp such that the fluid port can be secured over the annulus test opening when the clamp segment is secured circumferentially around the tubing of the pipe segment, for example, via one or more threaded fasteners, such as a bolt or a screw.

In any case, as described above, to facilitate testing the integrity of a pipe segment, test fluid may be injected into the tubing annulus of the pipe segment via a test fluid source and downstream fluid may be in communication with a fluid parameter sensor to enable the fluid parameter sensor to determine one or more resulting downstream fluid parameters. To facilitate fluidly connecting a test fluid source and/or a fluid parameter sensor thereto, in some embodiments, a fluid port in a test head assembly may be threaded to interlock with threading on an external fluid conduit, such as a hose, thereby enabling the test fluid source and/or the fluid parameter sensor to be fluidly connected to the fluid port and, thus, the tubing annulus of a corresponding pipe segment via the external fluid conduit. In this manner, as will be described in more detail below, the present disclosure provides techniques for implementing and/or deploying a test head assembly to facilitate testing integrity of one or more pipe segments in a pipeline system, which, at least in some instances, may facilitate improving operational reliability of the pipeline system, for example, at least in part by enabling damage (e.g., a fault) in the pipeline system to be detected.

To help illustrate, an example of a pipeline system 10 is shown in FIG. 1. As in the depicted example, a pipeline system 10 may generally be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer than three (e.g., two or one) pipe segments 20 or more than three (e.g., four, five, or more)

pipe segments 20. Additionally or alternatively, in other embodiments, a pipeline system 10 may include fewer than four (e.g., three or two) pipe fittings 18 or more than four (e.g., five, six, or more) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, the tubing of a pipe segment 20 may be implemented using multiple different tubing layers. For example, the tubing of a pipe segment 20 may include a first high-density polyethylene (e.g., internal barrier) layer, one or more intermediate (e.g., steel strip) layers external to the first high-density polyethylene layer, and a second high-density polyethylene (e.g., external corrosion protection) layer external to the one or more intermediate layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may additionally include free space (e.g., one or more gaps) devoid of solid material. In fact, in some embodiments, free space defined in the tubing of a pipe segment 20 may run (e.g., span) the length of the pipe segment 20 and, thus, define (e.g., enclose) a fluid conduit (e.g., free space) in the annulus of the tubing, which is separate from the pipe bore. In other words, in such embodiments, fluid may flow through a pipe segment 20 via its pipe bore, free space (e.g., gaps and/or one or more fluid conduits) defined within its tubing annulus, or both.

Figure 2:
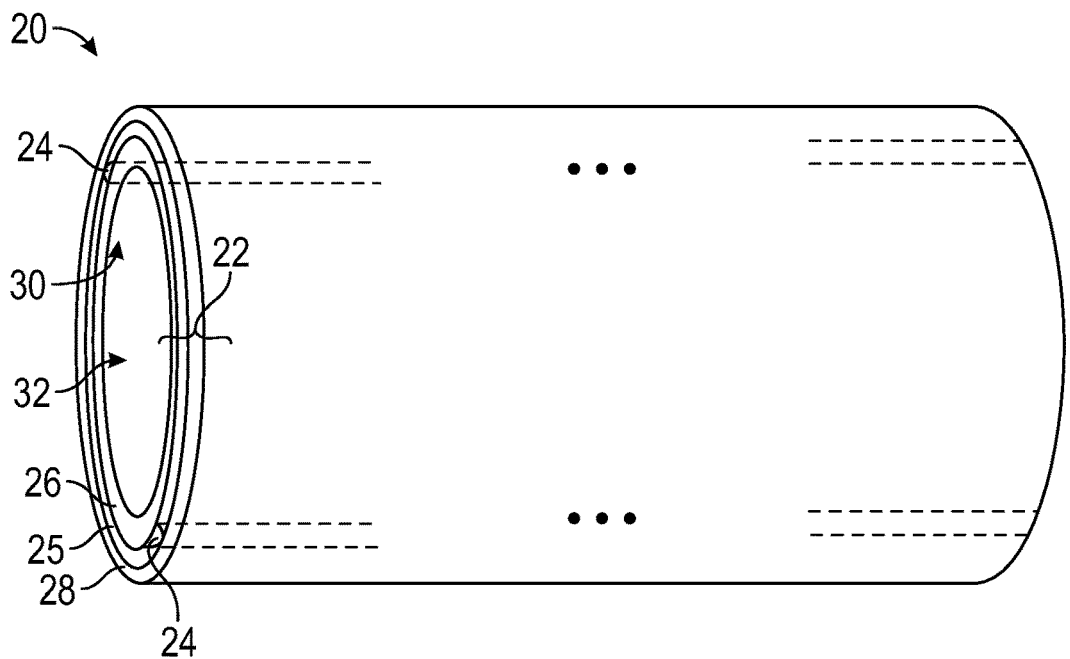
FIG. 2 is a side view of an example of a pipe segment of FIG. 1 that includes a pipe bore defined by its tubing as well as fluid conduits defined within an annulus of its tubing, in accordance with an embodiment of the present disclosure.

To help illustrate, an example of a pipe segment 20, which includes tubing 22 with fluid conduits (e.g., free space) 24 defined in its annulus 25, is shown in FIG. 2. As depicted, the pipe segment tubing 22 is implemented with multiple tubing layers including an inner barrier (e.g., liner) layer 26 and an outer barrier (e.g., shield and/or sheath) layer 28. In some embodiments, the inner barrier layer 26 and/or the outer barrier layer 28 of the pipe segment tubing 22 may be implemented using composite material and/or plastic, such as high-density polyethylene (HDPE), raised temperature polyethylene (PE-RT), cross-linked polyethylene (XLPE), polyamide 11 (PA-11), polyamide 12 (PA-12), polyvinylidene difluoride (PVDF), or other materials or combinations of materials. Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the inner barrier layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner barrier layer 26 and its outer barrier layer 28. As will be described in more detail below, the tubing annulus 25 may include one or more intermediate layers of the pipe segment tubing 22. Furthermore, as depicted, fluid conduits (e.g., free space and/or gaps) 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 defined in its annulus 25 may include less solid material and, thus, exert less resistance to flexure, for example, compared to solid pipe segment tubing 22 and/or pipe segment tubing 22 that does not include fluid conduits 24 defined therein. Moreover, to facilitate further improving pipe flexibility, in some embodiments, one or more tubing layers in the tubing 22 of a pipe segment 20 may be unbonded from one or more other tubing layers and, thus, the pipe segment 20 may be an unbonded pipe.

However, it should be appreciated that the depicted example is merely intended to be illustrative and not limiting. In particular, in other embodiments, a pipe segment 20 may include fewer than two (e.g., one) or more that two (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the pipe bore 32 of the pipe segment 20, for example, such that the fluid conduit 24 is skewed relative to the longitudinal extent of the pipe bore 32 of the pipe segment 20.

Figure 3:
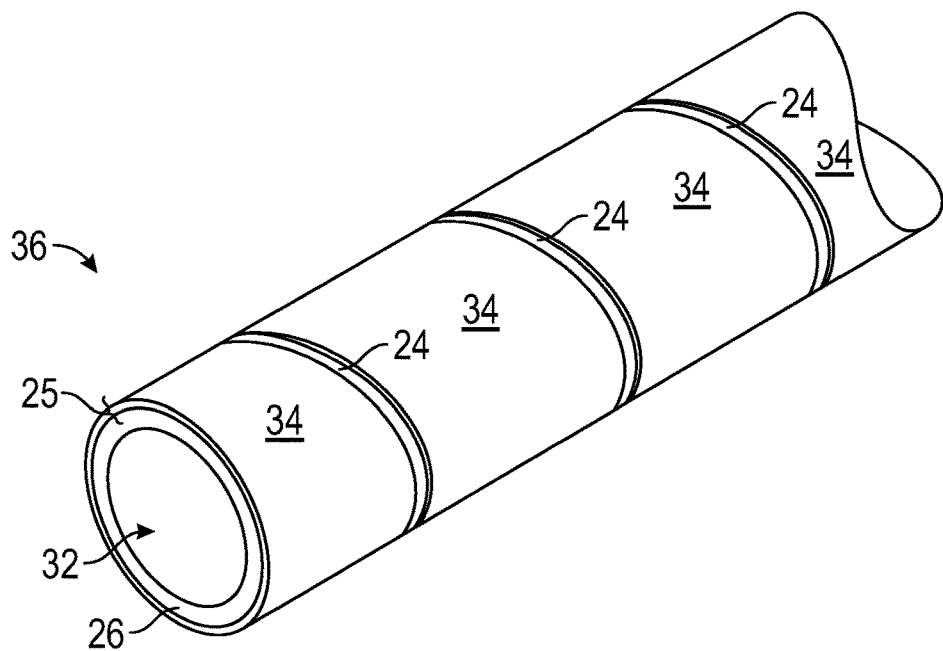
FIG. 3 is an example of a portion of the pipe segment of FIG. 2 with a helically shaped fluid conduit defined within its tubing annulus, in accordance with an embodiment of the present disclosure.

To help illustrate, an example of a portion 36 of a pipe segment 20, which includes an inner barrier layer 26 and an intermediate layer 34 included in its tubing annulus 25, is shown in FIG. 3. In some embodiments, one or more intermediate layers 34 of the pipe segment tubing 22 may be implemented at least in part using composite material and/or metal, such as carbon steel, stainless steel, duplex stainless steel, super duplex stainless steel, or any combination thereof. In other words, at least in some such embodiments, the intermediate layer 34 of the pipe segment tubing 22 may be implemented using electrically conductive, which, at least in some instances, may enable communication of electrical (e.g., control and/or sensor) signals via the intermediate layer 34.

In any case, as depicted, the intermediate layer 34 is helically disposed (e.g., wound and/or wrapped) on the inner barrier layer 26 such that free space is left between adjacent windings to define a fluid conduit 24. In other words, in some embodiments, the intermediate layer 34 may be implemented at least in part by winding a metal (e.g., steel) strip around the inner barrier layer 26 at a non-zero lay angle relative to the longitudinal extent of the pipe bore 32. In such a case, the resulting fluid conduit 24 runs helically along the pipe segment 20.

In some embodiments, an outer barrier layer 28 may be disposed directly over the depicted intermediate layer 34 and, thus, cover and/or define (e.g., enclose) the depicted fluid conduit 24. However, in other embodiments, the tubing annulus 25 of a pipe segment 20 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that free space is left between adjacent windings to implement one or more corresponding fluid conduits 24 in the tubing annulus 25 of the pipe segment 20.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer barrier layer 28 may be disposed over the third other intermediate layer 34 and, thus, cover (e.g., define and/or enclose) the other fluid conduit 24 in the third other intermediate layer 34.

In any case, as described above, the tubing 22 of a pipe segment 20 may generally be implemented to facilitate isolating conditions within the pipe bore 32 of the pipe segment 20 from environmental conditions external to the pipe segment 20. However, even when implemented with multiple tubing layers, in some instances, a fault, such as a breach, a kink, and/or a dent, in the tubing 22 of a pipe segment 20 may compromise its integrity and, thus, its ability to provide isolation, for example, due to the fault resulting in the tubing annulus 25 becoming contaminated by external environmental conditions. As such, at least in some instances, operating a pipeline system 10 while the tubing 22 of a pipe segment 20 deployed therein has an integrity compromising fault may affect (e.g., reduce) operational reliability of the pipeline system 10. As such, to facilitate improving operational reliability of a pipeline system 10, in some embodiments, the integrity of a pipe segment 20 may be tested via a testing system.

Figure 4:
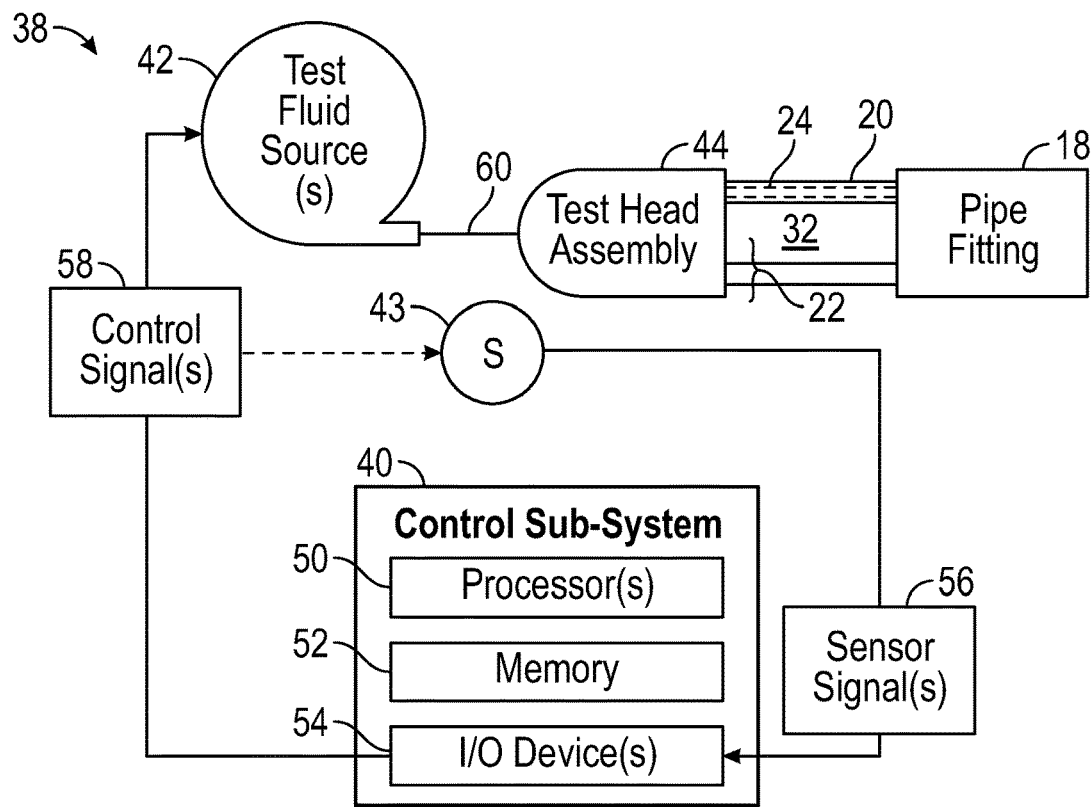
FIG. 4 is a block diagram of an example of a testing system that includes a test head assembly, in accordance with an embodiment of the present disclosure.

To help illustrate, an example of a testing system 38, which may be used to test the integrity of a pipe segment 20, is shown in FIG. 4. As in the depicted example, a testing system 38 may generally include a control sub-system 40, one or more test fluid sources 42, one or more fluid parameter sensors 43, and at least one test head assembly 44. In particular, as depicted, the test head assembly 44 is coupled to an (e.g., first) end of the pipe segment 20 being tested.

However, it should be appreciated that the depicted example is merely intended to be illustrative and not limiting. In particular, although a single pipe segment 20 is depicted, in other embodiments, multiple pipe segments 20 may be concurrently tested, for example, by fluidly coupling the pipe segments 20 between the test head assembly 44 and the depicted pipe fitting 18 via one or more midline pipe fittings 18. Additionally or alternatively, although a pipe fitting 18 is depicted as being coupled to another (e.g., second and/or opposite) end of the pipe segment 20 being tested, in other embodiments, another test head assembly 44 may be used instead. In other words, in such embodiments, a first test head assembly 44 may be coupled to a first end of a pipe segment 20 while a second test head assembly 44 is coupled to a second (e.g., opposite) end of the pipe segment 20.

In any case, in some embodiments, a test fluid source 42 in the testing system 38 may include a test fluid pump and/or a compressed gas tank, which is implemented and/or operated to selectively supply (e.g., inject and/or pump) test fluid to the test head assembly 44 via one or more external fluid conduits (e.g., hoses) 60, for example, based at least in part on a control signal 58 received from the control sub-system 40 and/or valve position of one or more valves fluidly coupled between the test fluid source 42 and the test head assembly 44. Although testing examples that utilize test fluid injection are described, in other embodiments, the techniques described in the present disclosure may additionally or alternatively be utilized in testing systems 38 that are based on test fluid extraction. In other words, in such embodiments, the test fluid source 42 in the testing system 38 may include a test fluid pump, which is implemented and/or operated to selectively extract (e.g., vacuum and/or pump) test fluid out from the test head assembly 44 via one or more external fluid conduits 60, for example, based at least in part on a control signal 58 received from the control sub-system 40 and/or valve position of one or more valves fluidly coupled between the test fluid source 42 and the test head assembly 44.

Thus, at least in some embodiments, the control sub-system 40 may generally control operation of the testing system 38. To facilitate controlling operation, as in the depicted example, a control sub-system 40 may generally include one or more processors 50, memory 52, and one or more input/output (I/O) devices 54. In particular, in some embodiments, the memory 52 in a control sub-system 40 may include one or more tangible, non-transitory, computer-readable media that are implemented and/or operated to store data and/or executable instructions. For example, the memory 52 may store sensor data based at least in part on one or more sensor signals 56 received from a fluid parameter sensor 43. As such, in some embodiments, the memory 52 may include volatile memory, such as random-access memory (RAM), and/or non-volatile memory, such as read-only memory (ROM), flash memory, a solid-state drive (SSD), a hard disk drive (HDD), or any combination thereof.

Additionally, in some embodiments, a processor 50 in a control sub-system 40 may include processing circuitry that is implemented and/or operated to process data and/or execute instructions stored in memory 52. In other words, in some such embodiments, a processor 50 in a control sub-system 40 may include one or more general purpose microprocessors, one or more application specific integrated circuits (ASICs), one or more field programmable gate arrays (FPGAs), or any combination thereof. For example, a processor 50 in a control sub-system 40 may process sensor data stored in memory 52 to determine an integrity state of a pipe segment 20 being tested.

Additionally or alternatively, a processor 50 in a control sub-system 40 may execute instructions stored in memory 52 to determine one or more control (e.g., command) signals 58 that instruct the testing system 38 to perform a corresponding control action. For example, the control sub-system 40 may determine a control signal 58 that instructs a test fluid source 42 to supply (e.g., inject and/or pump) test fluid to the test head assembly 44. As another example, the control sub-system 40 may determine a control signal 58 that instructs a fluid parameter sensor 43 to return one or more sensor signals 56 indicative of corresponding fluid parameters, such as fluid temperature, fluid pressure, and/or fluid composition, determined (e.g., sensed and/or measured) by the fluid parameter sensor 43.

To enable communication outside a control sub-system 40, in some embodiments, the I/O devices 54 of the control sub-system 40 may include one or more input/output (I/O) ports (e.g., terminals). Additionally, to facilitate communicating the results of an integrity test to a user (e.g., operator), in some embodiments, the I/O devices 54 of a control sub-system 40 may include one or more user output devices, such as an electronic display, which is implemented and/or operated to display a graphical user interface (GUI) that provides a visual representation of integrity test results (e.g., integrity state of tested pipe segment 20). Furthermore, to enable user interaction with the testing system 38, in some embodiments, the I/O devices 54 of a control sub-system 40 may include one or more user input devices, such as a hard button, a soft button, a keyboard, a mouse, and/or the like. For example, the one or more user input devices may enable an operator to input a user command that instructs the testing system 38 to initiate an integrity test for a pipe segment 20.

In any case, as described above, the tubing 22 of a pipe segment 20 is generally implemented to facilitate isolating (e.g., insulating) conditions internal to the pipe segment 20 from environmental conditions external to the pipe segment 20. For example, an outer barrier layer 28 of a pipe segment may be implemented to facilitate isolating the external environmental conditions from conditions in the pipe bore 32 of the pipe segment 20 and, thus, from conditions in free space (e.g., one or more a fluid conduits 24) defined within the tubing annulus 25 of the pipe segment 20, which is internal to the outer barrier layer 28 of the pipe segment 20. Additionally or alternatively, an inner barrier layer 26 of a pipe segment 20 may be implemented to facilitate isolating the conditions in the pipe bore 32 of the pipe segment 20 from the external environmental condition and, thus, from the conditions in free space defined within the tubing annulus 25 of the pipe segment 20, which is external to the inner barrier layer 26 of the pipe segment tubing 22.

Nevertheless, in some instances, a fault, such as a dent, a kink, and/or a breach, in the tubing 22 of a pipe segment 20 may affect (e.g., compromise and/or reduce) its integrity and, thus, its ability to provide isolation. For example, a fault in the outer barrier layer 28 of a pipe segment 20 may reduce its ability to provide isolation between environmental conditions external to the pipe segment 20 and the conditions in free space (e.g., one or more fluid conduits 24) defined within the tubing annulus 25 of the pipe segment 20, which is internal to the outer barrier layer 28 of the pipe segment 20. Additionally or alternatively, a fault in the inner barrier layer 26 of a pipe segment 20 may reduce its ability to provide isolation between the conditions in the pipe bore 32 of the pipe segment 20 and the conditions in free space defined within the tubing annulus 25 of the pipe segment 20, which is external to the inner barrier layer 26 of the pipe segment 20.

Generally, when a fault is not present in its tubing 22, one or more parameters (e.g., characteristics and/or properties) of fluid flowing through a pipe segment 20 may nevertheless change as it flows therethrough. However, a fluid parameter change resulting from fluid flow through a pipe segment 20 with non-faulty pipe segment tubing 22 is generally predictable, for example, based at least in part on a model, empirical testing, environmental conditions external to the pipe segment 20, fluid parameters of fluid input (e.g., supplied) to the pipe segment 20, implementation parameters, such as material and/or thickness, of the pipe segment tubing 22, or any combination thereof. In other words, at least in some instances, an unexpected (e.g., unpredicted) change in a fluid parameter resulting from fluid flow through a pipe segment 20 may be indicative of the tubing 22 of the pipe segment 20 potentially having one or more faults, such as a dent, a kink, and/or a breach.

Leveraging this fact, to facilitate testing pipe integrity, in some embodiments, the testing system 38 may inject test fluid into free space (e.g., one or more fluid conduits 24) defined within the tubing annulus 25 (e.g., one or more intermediate layers 34) of the pipe segment 20, for example, via a test fluid source 42 fluidly connected to the test head assembly 44 via one or more external fluid conduits 60. In particular, in some embodiments, the test fluid may be an inert fluid, such as nitrogen (e.g., $N_2$) gas. Additionally, in some embodiments, one or more fluid parameters (e.g., temperature, pressure, and/or composition) of the test fluid may be pre-determined before supply to the tubing annulus 25 of a pipe segment 20, for example, offline by a test lab and/or a fluid supplier such that the pre-determined fluid parameters of the test fluid are stored in memory 52 of a control sub-system 40. In some embodiments, one or more fluid parameters of the test fluid may be additionally or alternatively determined (e.g., sensed and/or measured) while the test fluid is being supplied to the tubing annulus 25 of the pipe segment 20, for example, online and/or in real-time via one or more fluid parameter sensors 43 such that the input (e.g., initial) fluid parameters of the test fluid are stored in memory 52 of the control sub-system 40.

As described above, at least in some instances, a fault in the tubing 22 of a pipe segment 20 may result in one or more parameters of fluid flowing through the pipe segment 20 changing in a manner different than expected (e.g., predicted). To facilitate determining changes in fluid parameters resulting from fluid flow in the tubing annulus 25 of a pipe segment 20, in some embodiments, the testing system 38 may determine one or more downstream fluid parameters (e.g., temperature, pressure, and/or composition) via one or more fluid parameter sensors 43, for example, which are fluidly connected to the test head assembly 44 (e.g., via one or more external fluid conduits 60). In other words, in such embodiments, the testing system 38 may test the integrity of the pipe segment 20 at least in part by comparing one or more fluid parameters of fluid (e.g., test fluid) supplied to the tubing annulus 25 of the pipe segment 20 and corresponding downstream fluid parameters resulting from fluid flow through the tubing annulus 25. Thus, at least in some instances, implementing and/or operating a testing system 38 in this manner may facilitate improving operational reliability of a pipeline system 10, for example, by enabling confirmation of pipe segment integrity and/or amelioration of a pipe segment fault before beginning and/or resuming normal operation of the pipeline system 10.

Figure 5:
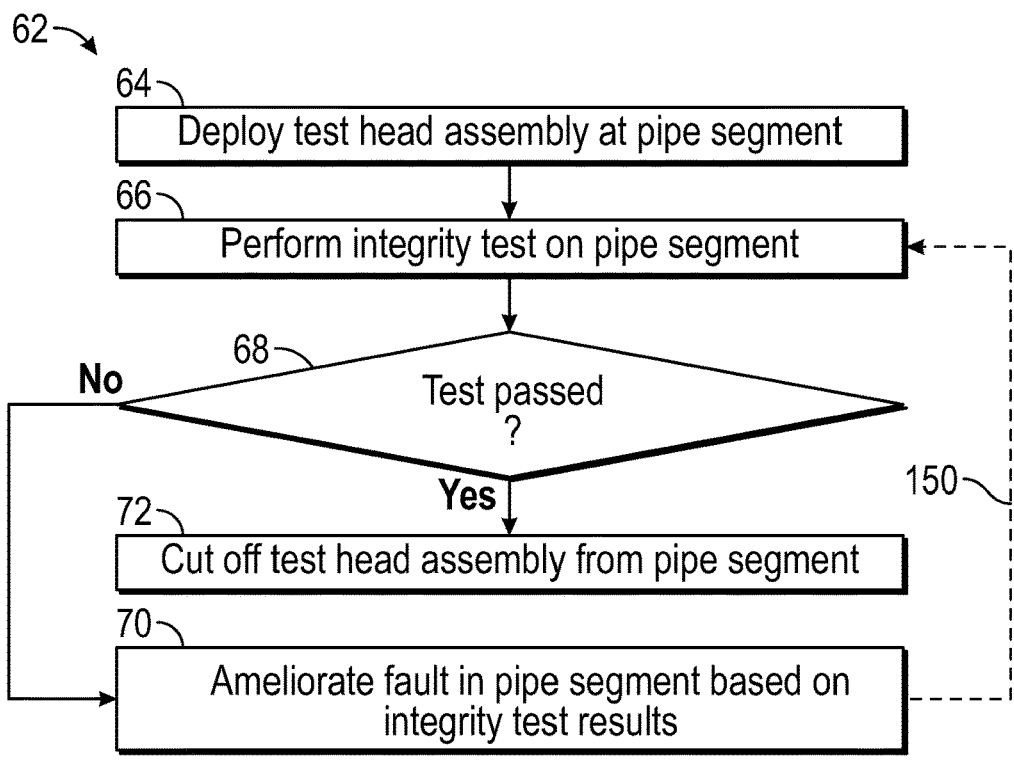
FIG. 5 is a flow diagram of an example of a process for operating the testing system of FIG. 4, in accordance with an embodiment of the present disclosure.

To help further illustrate, an example of a process 62 for operating a testing system 38 is described in FIG. 5. Generally the process 62 includes deploying a test head assembly at a pipe segment (process block 64) and performing an integrity test on the pipe segment (process block 66). Additionally, the process 62 generally includes determining whether the integrity test is passed (decision block 68), ameliorating a fault in the pipe segment based on results of the integrity test when the integrity test is not passed (process block 70), and cutting off the test head assembly from the pipe segment when the integrity test is passed (process block 72).

Although described in a specific order, which corresponds with an embodiment of the present disclosure, it should be appreciated that the example process 62 is merely intended to be illustrative and not limiting. In particular, in other embodiments, a process 62 for operating a testing system 38 may include one or more additional process blocks and/or omit one or more of the depicted process blocks. Moreover, in some embodiments, the process 62 may be performed at least in part by executing instructions stored in one or more tangible, non-transitory, computer-readable media, such as memory 52 in a control sub-system 40, using processing circuitry, such as a processor 50 in the control sub-system 40.

For example, in some embodiments, a control sub-system 40 in a testing system 38 may control operation of deployment equipment to facilitate deploying a test head assembly 44 at a pipe segment 20 (process block 64). However, in other embodiments, deployment equipment may be manually operated by an operator (e.g., user and/or service technician) of a testing system 38 to deploy a test head assembly 44 at a pipe segment 20. In any case, as will be described in more detail below, in some embodiments, the deployment equipment may include a drill, for example, which is used to form one or more openings in the tubing 22 of a pipe segment 20 and/or to tighten one or more threaded fasteners of a test head assembly 44.

Figure 6:
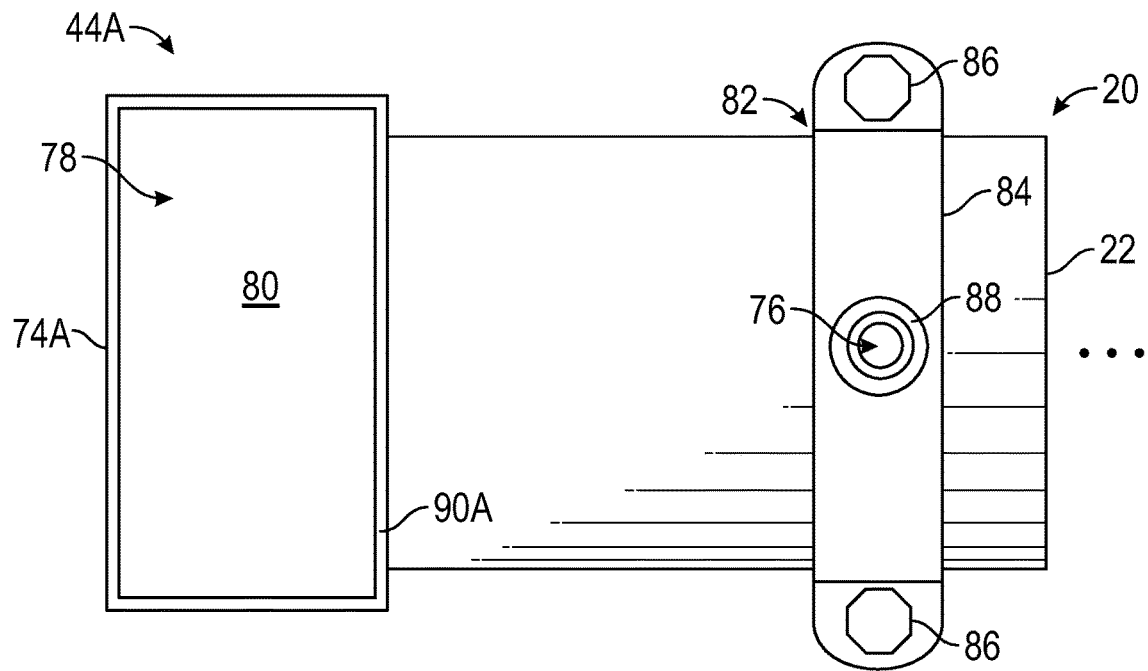
FIG. 6 is a top view of an example of the test head assembly of FIG. 4 secured to a pipe segment, in accordance with an embodiment of the present disclosure.

To help illustrate, an example of a test head assembly 44A secured to the tubing 22 of a pipe segment 20 is shown in FIG. 6. As in the depicted example, a test head assembly 44 may generally include an end container 74, a fluid port 88, and an annulus seal 78, which is implemented using hardening material 80, such as epoxy, disposed within the end container 74. More specifically, to facilitate testing the integrity of a pipe segment 20, a fluid port 88 in a test head assembly 44 may generally be implemented to be fluidly connected to the tubing annulus 25 of the pipe segment, for example, to enable a test fluid source 42 to inject test fluid into the tubing annulus 25 and/or a fluid parameter sensor 43 to determine one or more resulting downstream fluid parameters.

To facilitate fluidly connecting a fluid port 88 to the tubing annulus 25 of a pipe segment 20, as in the depicted example, in some embodiments, the fluid port 88 may be aligned with an annulus test opening 76, which is formed through the outer barrier layer 28 of the pipe segment 20 to the tubing annulus 25 of the pipe segment 20. However, it should be appreciated that the depicted example is merely intended to be illustrative and not limiting. In particular, in other embodiments, a test head assembly 44 may include multiple fluid ports 88 and multiple annulus test openings 76. For example, in such embodiments, the test head assembly 44 may include a first fluid port 88 and a first annulus test opening 76 dedicated (e.g., fluidly connected) to a test fluid source 42 as well as a second fluid port 88 and a second annulus test opening 76 dedicated to a fluid parameter sensor 43. Alternatively, as will be described in more detail below, in other embodiments, a fluid port 88 of a test head assembly 44 may be fluidly connected to the tubing annulus 25 of a corresponding pipe segment 20 via an annulus tube that extends through the hardening material annulus seal 78 of the test head assembly 44.

In any case, as in the depicted example, to facilitate securing a fluid port 88 over an annulus test opening 76, in some embodiments, the fluid port 88 may be part of a saddle clamp 82. As depicted, a saddle clamp 82 may generally include multiple (e.g., two) clamp segments 84, which are implemented to be secured circumferentially around corresponding pipe segment tubing 22 via threaded fasteners 86, such as bolts or screws. Additionally, as depicted, the fluid port 88 may be integrated with a clamp segment 84 of the saddle clamp 82 such that the fluid port 88 opens through the clamp segment 84 and can be aligned with an annulus test opening 76 in corresponding pipe segment tubing 22. Thus, in such embodiments, the fluid port 88 may be secured over the annulus test opening 76 at least in part by securing the clamp segment 84 circumferentially around the pipe segment tubing 22.

However, it should again be appreciated that the depicted example is merely intended to illustrative and not limiting. In particular, in other embodiments, a fluid port 88 in a test head assembly 44 may be a separate component that is implemented to be secured (e.g., welded) over a corresponding annulus test opening 76, for example, instead of being part of a saddle clamp 82. Alternatively, in other embodiments, a saddle clamp 82 in a test head assembly 44 may be secured using a single threaded fastener 86 or more than two (e.g., three, four, or more) threaded fasteners 86

In any case, although obfuscated from view by the hardening material 80, an end of the pipe segment tubing 22 is disposed within the end container 74A of the test head assembly 44A. In particular, although obfuscated from view, the end container 74A includes a sidewall 90A with a tubing opening, which is implemented to enable pipe segment tubing 22 to be inserted into the end container 74. As depicted, hardening material 80, such as epoxy, is disposed within the end container 74A such that, once solidified (e.g., cured and/or hardened), solid hardening material 80 encases and bonds to an end of the tubing 22 of the pipe segment 20, thereby implementing a hardening material annulus seal 78 that facilitates securing the test head assembly 44 to the pipe segment 20 and sealing an open end of the tubing annulus 25 of the pipe segment 20 in the test head assembly 44.

Figure 7:
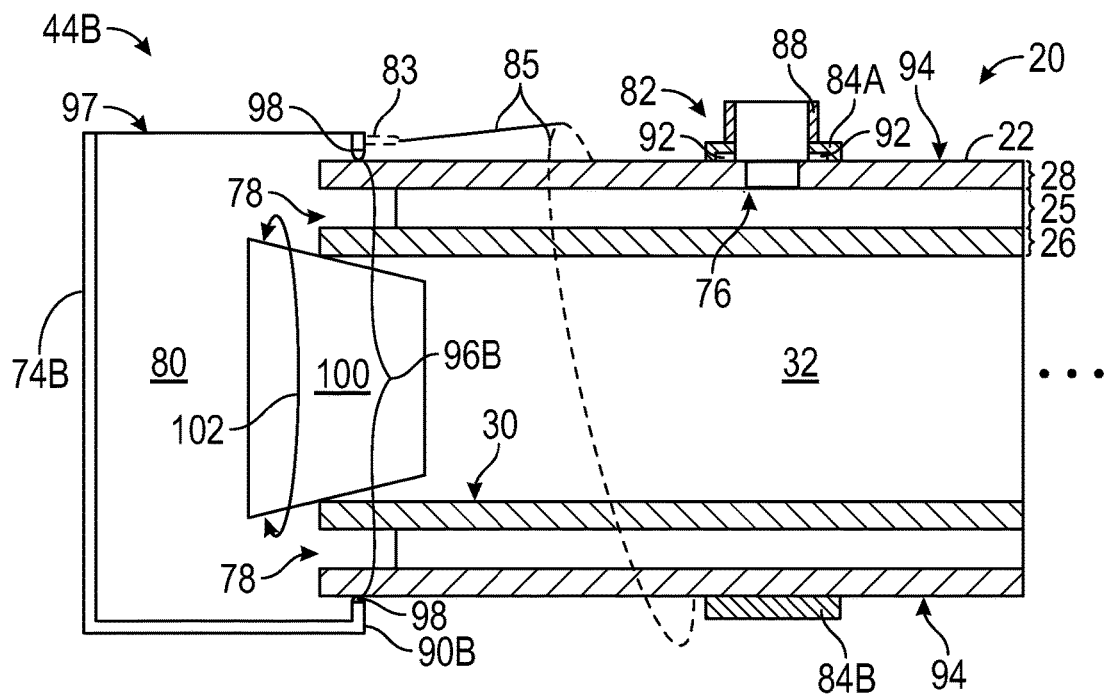
FIG. 7 is a cross-sectional view of an example of the test head assembly of FIG. 6, which includes a bore plug, in accordance with an embodiment of the present disclosure.

To help more clearly illustrate, a cross-sectional view of an example of a test head assembly 44B secured to the tubing 22 of a pipe segment 20 is shown in FIG. 7. As depicted, the test head assembly 44B generally includes an end container 74B, an annulus seal 78 implemented using hardening material 80, such as epoxy, a fluid port 88, and an annulus test opening 76, which is formed through the outer barrier layer of the pipe segment 20 to the tubing annulus 25 of the pipe segment 20. In fact, in some embodiments, the annulus test opening 76 of FIG. 7 may generally match the annulus test opening 76 of FIG. 6.

Additionally, similar to FIG. 6, to facilitate securing the fluid port 88 over the annulus test opening 76, as depicted in FIG. 7, the fluid port 88 is part of a saddle clamp 82. In fact, in some embodiments, the fluid port 88 of FIG. 7 may generally match the fluid port 88 of FIG. 6, the saddle clamp 82 of FIG. 7 may generally match the saddle clamp 82 of FIG. 6, or both. In any case, to facilitate securing its fluid port 88 over an annulus test opening 76 formed in a pipe segment 20, in the depicted example, the saddle clamp 82 includes clamp segments 84—namely a first (e.g., upper) clamp segment 84A and a second (e.g., lower) clamp segment 84B—that are implemented to be secured circumferentially around the tubing 22 of the pipe segment 20. In particular, in the depicted example, the fluid port 88 is integrated with and extends through the first clamp segment 84A. Thus, in such embodiments, the fluid port 88 may be secured over an annulus test opening 76 formed in a pipe segment 20 at least in part by securing corresponding clamp segment 84 of a saddle clamp 82 circumferentially around the tubing 22 of the pipe segment 20. Moreover, as in the depicted example, to facilitate reducing the likelihood of fluid inadvertently leaking out therefrom, in some such embodiments, a test head assembly 44 may additionally include a gasket 92, which is implemented to be secured between its saddle clamp 82 and the outer surface 94 of corresponding pipe segment tubing 22.

In any case, as depicted, the end container 74B of the test head assembly 44B includes a sidewall 90B with a tubing opening 96B formed therethrough to enable an end of pipe segment tubing 22 to be inserted into the end container 74B. After the pipe segment tubing 22 is inserted into the end container 74B, fluid hardening material 80 may be flowed (e.g., supplied and/or poured) into the end container 74B, for example, via its open top 97. In particular, in some embodiments, the fluid hardening material 80 may be liquid epoxy, molten metal, liquid cement, liquid adhesive, spray foam, liquid elastomer (e.g., silicone or caulk), liquid polymer (e.g., polyethylene (PE), nylon, or polyvinyl chloride (PVC), and/or the like.

To facilitate reducing the likelihood of fluid hardening material 80 inadvertently leaking out therefrom, as depicted, an end container 74 generally includes one or more container seals 98. In particular, as depicted, a container seal 98 is attached to the sidewall 90B of the end container 74B along an edge of the tubing opening 96B. More specifically, the container seal 98 may be attached to the sidewall 90B such that the container seal 98 is compressed against the outer surface 94 of pipe segment tubing 22 and, thus, activated when the pipe segment tubing 22 is disposed within the tubing opening 96B. Thus, in some embodiments, a container seal 98 on an end container 74 may be implemented using elastic material, such as rubber or silicone.

Additionally, as in the depicted example, to facilitate blocking fluid hardening material 80 from flowing into the pipe bore 32 of a pipe segment 20, in some embodiments, a test head assembly 44 may additionally include a (e.g., coned) bore plug 100. In particular, in such embodiments, the bore plug 100 may be implemented to be inserted into the pipe bore 32 of a pipe segment 20 such that the outer surface 102 of the bore plug 100 engages the inner surface 30 of the tubing 22 of the pipe segment 20 and, thus, facilitates sealing the pipe bore 32, for example, before the pipe segment tubing 22 is inserted into a corresponding end container 74. Thus, in some such embodiments, a bore plug 100 in a test head assembly 44 may be implemented using elastic material, such as rubber, silicone, or wood.

In fact, in some such embodiments, an ending outer surface diameter of the bore plug 100 in a test head assembly 44 may initially be larger than an inner surface diameter of the tubing 22 of a pipe segment 20, for example, due to ovalization of the pipe segment tubing 22. Accordingly, at least in such instances, inserting the bore plug 100 into the pipe bore 32 of the pipe segment 20 may facilitate circularizing (e.g., re-circularizing) the tubing 22 of the pipe segment 20. In other words, at least in such instances, inserting the bore plug 100 into the pipe bore 32 of the pipe segment 20 may facilitate properly aligning the tubing 22 of the pipe segment 20 with a corresponding tubing opening 96 in an end container 74 and, thus, a container seal 98 attached along an edge of the tubing opening 96.

In any case, after hardening material 80, such as epoxy, disposed within the end container 74 of a test head assembly 44 is solidified (e.g., cured and/or hardened), solid hardening material 80 may encase and bond to an end of the tubing 22 of a corresponding pipe segment 20, thereby implementing a hardening material annulus seal 78 that facilitates securing the test head assembly 44 to the pipe segment 20 as well as sealing an open end of the tubing annulus 25 of the pipe segment 20 in the test head assembly 44. In fact, as in the depicted example, to facilitate improving sealing integrity, in some embodiments, the hardening material annulus seal 78 of a test head assembly 44 may be implemented to partially extend into the tubing annulus 25 of a corresponding pipe segment 20. Additionally, to facilitate improving securement strength, in some embodiments, pipe segment tubing 22 may scored (e.g., roughed up) or otherwise contoured to increase bonding surface area between the solidified hardening material 80 and the pipe segment tubing 22.

As in the depicted example, to facilitate further securing the end container 74 and the hardening material 80 of a test head assembly 44 to a pipe segment 20, in some embodiments, the test head assembly 44 may additionally include a pad eye 83, which is implemented to enable one or more straps (e.g., chains) 85 to be secured thereto. In particular, as in the depicted example, in some such embodiments, the pad eye 83 may be integrated with the end container 74 of the test head assembly 44. However, in other embodiments, a pad eye 83 of a test head assembly 44 may be implemented as a separate component, for example, which is embedded within the hardening material 80 of the test head assembly 44. In any case, as in the depicted example, a strap 85, which is wrapped around the tubing 22 of a pipe segment 20, may be secured to a pad eye 83 in a test head assembly 44 and, thus, facilitate securing the end container 74 and the hardening material annulus seal 78 to the pipe segment tubing 22, for example, even after a bond between the hardening material 80 of the test head assembly 44 and the pipe segment tubing 22 is broken. In this manner, a test head assembly 44 may be implemented and/or deployed at a pipe segment 20 to enable the integrity of the tubing 22 of the pipe segment 20 to be tested.

However, it should be appreciated that the depicted example is merely intended to be illustrative and not limiting. In particular, in other embodiments, the test head assembly 44B may not include a pad eye 83 and/or one or more straps (e.g., chains) 85. Additionally, in other embodiments, a saddle clamp 82 in a test head assembly 44 may include a single (e.g., C-shaped) clamp segment 84 or more than two (e.g., three, four, or more) clamp segments 84. Furthermore, although a bore plug 100 with a conical shape is depicted, in other embodiments, a bore plug 100 in a test head assembly 44 may have a different shape, such as a cylindrical shape. Alternatively, in other embodiments, a test head assembly 44 may not include a bore plug 100, for example, when the end container 74 of the test head assembly 44 is donut-shaped.

Figure 8:
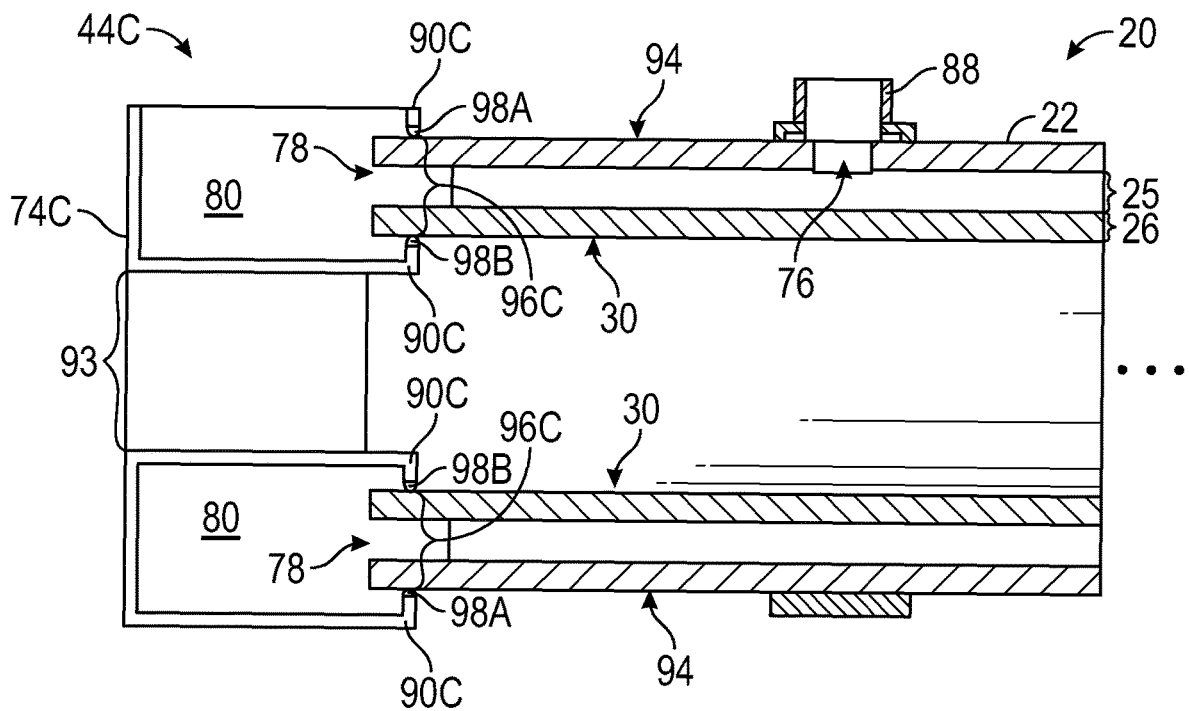
FIG. 8 is a cross-sectional view of another example of the test head assembly of FIG. 6, which includes a donut-shaped end container, in accordance with an embodiment of the present disclosure.

To help illustrate, a cross-sectional view of another example of a test head assembly 44C secured to the tubing 22 of a pipe segment 20 is shown in FIG. 8. Similar to FIG. 7, as depicted in FIG. 8, the test head assembly 44C generally includes an end container 74C, an annulus test opening 76, a fluid port 88, and hardening material 80 disposed within the end container 74C to implement a hardening material annulus seal 78. In fact, in some embodiments, the annulus test opening 76 of FIG. 8 may generally match the annulus test opening 76 of FIG. 7, the fluid port 88 of FIG. 8 may generally match the fluid port 88 of FIG. 7, or both.

However, as depicted in FIG. 8, the test head assembly 44C does not include a bore plug 100. Instead, to facilitate blocking fluid hardening material 80 from flowing into the pipe bore 32 of a pipe segment 20, as depicted, the end container 74C is implemented with a donut shape that has a hollow core 93. Additionally, to facilitate blocking fluid hardening material 80 from inadvertently leaking out therefrom, as depicted, the end container 74C includes an outer container seal 98A attached to its sidewall 90C along an outer edge of its tubing opening 96C to engage the outer surface 94 of the pipe segment tubing 22 as well as an inner container seal 98B attached to its sidewall 90C along an inner edge of its tubing opening 96C to engage the inner surface 30 of the pipe segment tubing 22.

Nevertheless, similar to FIG. 7, as depicted in FIG. 8, after hardening material 80, such as epoxy, disposed within the end container 74C solidifies (e.g., cures and/or hardens), solid hardening material 80 encases and bonds to an end of the tubing 22 of the pipe segment 20, thereby implementing a hardening material annulus seal 78 that facilitates securing the test head assembly 44C to the pipe segment 20 as well as sealing an open end of the tubing annulus 25 of the pipe segment 20 in the test head assembly 44. In fact, as in the depicted example, to facilitate improving sealing integrity, in some embodiments, the hardening material annulus seal 78 of a test head assembly 44 may be implemented to partially extend into the tubing annulus 25 of a corresponding pipe segment 20. Additionally, to facilitate improving securement strength, in some embodiments, pipe segment tubing 22 may be scored (e.g., roughed up) or otherwise contoured to increase bonding surface area between the solidified hardening material 80 and the pipe segment tubing 22. In any case, in this manner, a test head assembly 44 may be implemented and/or deployed at a pipe segment 20 to enable the integrity of the tubing 22 of the pipe segment 20 to be tested.

However, it should be appreciated that the depicted example is merely intended to be illustrative and not limiting. In particular, in other embodiments, the test head assembly 44C may additionally include a pad eye 83 and one or more straps (e.g., chains) 85. Additionally, in other embodiments, a hardening material annulus seal 78 may not be implemented within the tubing annulus 25 of a pipe segment 20. Alternatively, to facilitate controlling the amount a hardening material annulus seal 78 is implemented within the tubing annulus 25 of a pipe segment 20, in other embodiment, a test head assembly 44 may additionally include a depth check opening and/or an injection port in its end container 74.

Figure 9:
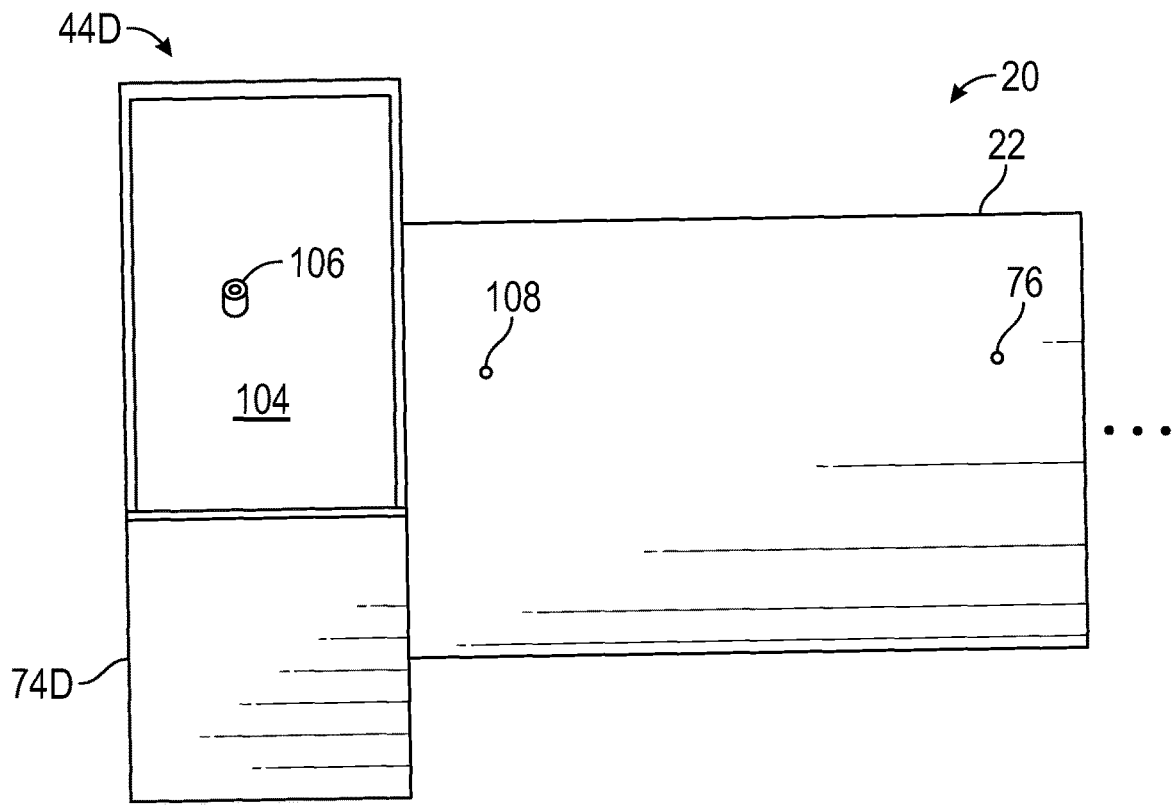
FIG. 9 is a perspective view of another example of the test head assembly of FIG. 4, which includes an injection port and a depth check opening, in accordance with an embodiment of the present disclosure.

To help illustrate, a further example of a test head assembly 44D secured to the tubing 22 of a pipe segment 20 is shown in FIG. 9. Similar to FIG. 6, as depicted in FIG. 9, the test head assembly 44D generally includes an end container 74D and an annulus test opening 76. In fact, in some embodiments, the annulus test opening 76 of FIG. 9 may generally match the annulus test opening 76 of FIG. 6. Although not depicted, similar to FIG. 6, the test head assembly 44D may additionally include a fluid port 88 secured over the annulus test opening 76.

However, as depicted in FIG. 9, the end container 74D includes a lid 104 with an injection port 106, for example, instead of an open top 97. Nevertheless, although obfuscated from view by the lid 104, similar to FIG. 6, the test head assembly 44D of FIG. 9 includes a hardening material annulus seal 78 implemented within the end container 74D. In some embodiment, the injection port 106 may be used to flow fluid hardening material 80, such as liquid epoxy, into the end container 74D. Additionally or alternatively, the injection port 106 may be used to inject air behind fluid hardening material 80, for example, to cause the fluid hardening material 80 to fill the end container 74D and/or to travel into the tubing annulus 25 of the pipe segment 20.

Furthermore, as in the depicted example, to facilitate controlling the distance fluid hardening material 80 travels into the tubing annulus 25 of a pipe segment 20 and, thus, the amount a resulting hardening material annulus seal 78 is implemented within the tubing annulus 25, in some embodiments, a test head assembly 44 may include a depth check opening 108, which is formed through the outer barrier layer 28 of the pipe segment 20 to the tubing annulus 25 of the pipe segment 20, in addition to one or more annulus test openings 76. In particular, the depth check opening 108 may be formed at a target depth of a hardening material annulus seal 78. Thus, as in the depicted example, the depth check opening 108 may be formed in a pipe segment 20 closer to a corresponding end container 74 than the annulus test opening 76. Accordingly, in such embodiments, a test head assembly 44 may be deployed at least in part by ceasing supply of fluid hardening material 80 and/or injection of air into the end container 74 once fluid hardening material 80 reaches its depth check opening 108.

However, it should be appreciated that the depicted example is merely intended to be illustrative and not limiting. In particular, in other embodiments, a test head assembly 44 may not include an annulus test opening 76. Instead, in such embodiments, a fluid port 88 of the test head assembly 44 may be fluidly connected to the tubing annulus 25 of a corresponding pipe segment 20 via an annulus tube embedded within the hardening material annulus seal 78 of the test head assembly 44 such that the annulus tube extends through the hardening material annulus seal 78.

Figure 10:
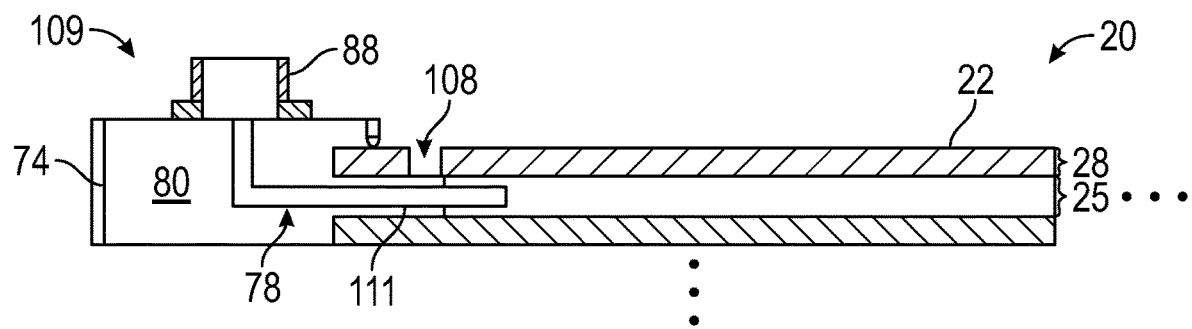
FIG. 10 is a cross-section view of a portion of a further example of the test head assembly of FIG. 4, which includes a fluid port fluidly connected to the tubing annulus of a pipe segment via an annulus tube embedded within a hardening material annulus seal, in accordance with an embodiment of the present disclosure.

To help illustrate, a cross-sectional view of an example of a portion 109 of a test head assembly 44 secured to the tubing 22 of a pipe segment 20 is shown in FIG. 10. Similar to FIGS. 6-8, as depicted in FIG. 10, the portion 109 of the test head assembly 44 generally includes an end container 74, a fluid port 88, and hardening material 80 disposed within the end container 74 to implement an annulus seal 78. In fact, in some embodiments, the end container 74 of FIG. 10 may generally match the end container 74B of FIG. 7 or the end container 74C of FIG. 8.

Additionally, similar to FIG. 9, as depicted in FIG. 10, the portion 109 of the test head assembly 44 includes a depth check opening 108, which is formed through the outer barrier layer 28 of the pipe segment 20 to the tubing annulus 25 of the pipe segment 20. In particular, as described above, a depth check opening 108 may be formed at a target depth of a corresponding hardening material annulus seal 78. Thus, as in the depicted example, the hardening material annulus seal 78 may extend into the tubing annulus 25 of the pipe segment 20 at least up to the depth check opening 108.

However, as depicted in FIG. 10, the portion 109 of the test head assembly 44 does not include an annulus test opening 76. Instead, as depicted, the fluid port 88 of the test head assembly 44 is fluidly connected to the tubing annulus 25 of the pipe segment 20 via an annulus tube 111, which is embedded in the hardening material annulus seal 78 of the test head assembly 44 such that the annulus tube 111 extends through the hardening material annulus seal 78 to free space (e.g., one or more fluid conduits 24) defined within the tubing annulus 25 of the pipe segment 20. In other words, to facilitate fluidly connecting a fluid port 88 to the tubing annulus 25 of a pipe segment 20, in such embodiments, an annulus tube 111 may be inserted into an open end of the tubing annulus 25 of the pipe segment 20, for example, such that the annulus tube 111 extends into the tubing annulus 25 beyond a depth check opening 108 formed in the pipe segment 20. After hardening material 80 is disposed within the end container 74, the fluid port 88 may then be secured (e.g., clamped and/or welded) to an exposed end of the annulus tube 111 to enable test fluid to be injected into and/or downstream fluid to be extracted from the tubing annulus 25 of the pipe segment 20.

However, it should be appreciated that the depicted example is merely intended to be illustrative and not limiting. In particular, in other embodiments, a test head assembly 44 may include an annulus tube 111 as well as an annulus test opening 76. For example, in such embodiments, the test head assembly 44 may include a first fluid port 88 fluidly connected to the tubing annulus 25 of a corresponding pipe segment 20 via an annulus tube 111 embedded within the hardening material annulus seal 78 of the test head assembly 44 as well as a second fluid port 88 fluidly connected to the tubing annulus 25 of the pipe segment 20 via an annulus test opening 76 formed through the outer barrier layer 28 of the pipe segment 20. In any case, in this manner, a test head assembly 44 may be implemented and/or deployed at a pipe segment 20 to enable the integrity of the tubing 22 of the pipe segment 20 to be tested.

Figure 11:
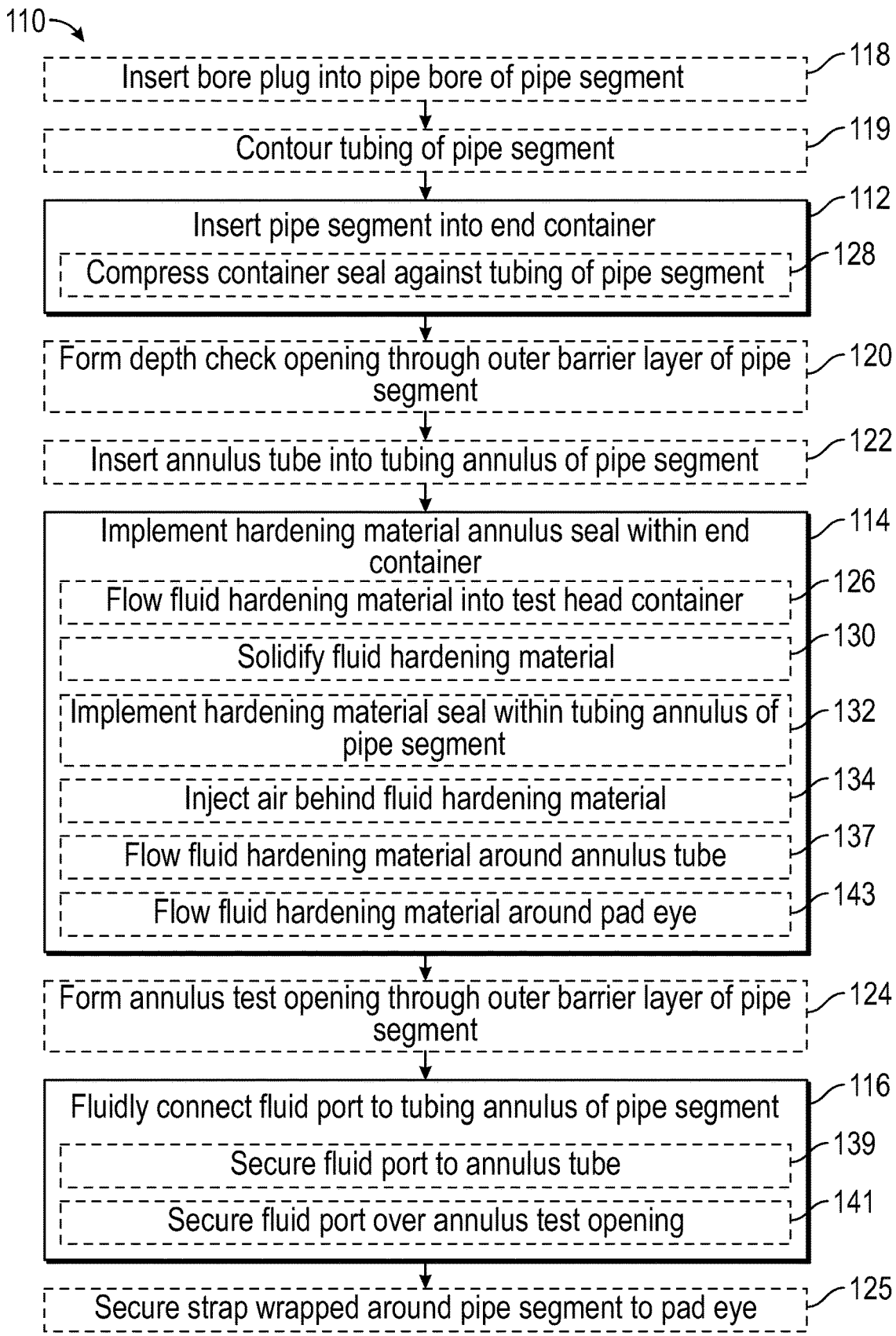
FIG. 11 is a flow diagram of an example of a process for deploying a test head assembly at a pipe segment, in accordance with an embodiment of the present disclosure.

To help further illustrate, an example of a process 110 for deploying a test head assembly 44 at a pipe segment 20 is described in FIG. 11. Generally, the process 110 includes inserting a pipe segment into an end container (process block 112) and implementing a hardening material annulus seal within the end container (process block 114). Additionally, the process 110 generally includes fluidly connecting a fluid port to a tubing annulus of the pipe segment (process block 116).

Although described in a specific order, which corresponds with an embodiment of the present disclosure, it should be appreciated that the example process 110 is merely intended to be illustrative and not limiting. In particular, in other embodiments, a process 110 for deploying a test head assembly 44 at a pipe segment 20 may include one or more additional process blocks and/or omit one or more of the depicted process blocks. For example, some embodiments of the process 110 may additionally include inserting a bore plug into a pipe bore of the pipe segment (process block 118) while other embodiments of the process 110 do not. As another example, some embodiments of the process 110 may additionally include contouring tubing of the pipe segment (process block 119) while other embodiments of the process 110 do not. As a further example, some embodiments of the process 110 may additionally include forming a depth check opening through the outer barrier layer of the pipe segment (process block 120) while other embodiment of the process 110 do not.

As another example, some embodiments of the process 110 may additionally include inserting an annulus tube into the tubing annulus of the pipe segment (process block 122) while other embodiments of the process 110 do not. As a further example, some embodiments of the process 110 may additionally include forming an annulus test opening through the outer barrier layer of the pipe segment (process block 124) while other embodiments of the process 110 do not. As another example, some embodiments of the process 110 may additionally include securing a strap wrapped around the pipe segment to a pad eye (process block 125) while other embodiments of the process 110 do not. Moreover, in other embodiments, one or more of the depicted process blocks may be performed in a different order, for example, such that the fluid port is fluidly connected to the tubing annulus of the pie segment before the pipe segment is inserted into the end container.

In any case, as described above, a test head assembly 44 in a testing system 38 may generally include an end container 74. In particular, as described above, the end container 74 may include a tubing opening 96, which is implemented to enable an end of the tubing 22 of a pipe segment 20 to be inserted into the end container 74. As such, deploying a test head assembly 44 at a pipe segment 20 may generally include inserting the tubing 22 of the pipe segment 20 into the end container 74 of the test head assembly 44 (process block 112).

Additionally, as described above, a test head assembly 44 in a testing system 38 may generally include an annulus seal 78 implemented at least within the end container 74 of the test head assembly 44 using hardening material 80, such as epoxy. As such, deploying a test head assembly 44 at a pipe segment 20 may generally include implementing a hardening material annulus seal 78 at least within the end container 74 of the test head assembly 44 (process block 114). In particular, as described above, a hardening material annulus seal 78 in a test head assembly 44 may generally be implemented at least in part by flowing fluid hardening material 80, such as liquid epoxy, into the end container 74 of the test head assembly 44 (process block 126).

To facilitate reducing the likelihood of fluid hardening material 80 inadvertently leaking out from the end container 74 of a test head assembly 44, as described above, a container seal 98 may be attached along each edge of a corresponding tubing opening 96. For example, a container seal 98 may be attached along an edge of a corresponding tubing opening 96 such that the container seal 98 is compressed against the outer surface 94 of pipe segment tubing 22 and, thus, activated when the pipe segment tubing 22 is disposed within the tubing opening 96. Accordingly, inserting a pipe segment 20 into the end container 74 of a test head assembly 44 may include compressing a container seal 98, which is attached to the end container 74, against the tubing 22 of the pipe segment 20 (process block 128).

Additionally, as described above, to facilitate blocking fluid hardening material 80 from flowing into the pipe bore 32 of a pipe segment 20, in some embodiments, a test head assembly 44 may additionally include a bore plug 100. In particular, as described above, in such embodiments, the bore plug 100 may be implemented to be inserted partially within the pipe bore 32 of the pipe segment 20 such that the outer surface 102 of the bore plug 100 engages the inner surface 30 of the tubing 22 of the pipe segment 20 and, thus, facilitates sealing the pipe bore 32. Thus, in such embodiments, deploying a test head assembly 44 at a pipe segment 20 may include inserting a bore plug 100 into the pipe bore 32 of the pipe segment 20, for example, before the pipe segment 20 is inserted into the end container 74 of the test head assembly 44 (process block 118). In fact, as described above, in some such embodiments, inserting a bore plug 100 into the pipe bore 32 of a pipe segment 20 may facilitate circularizing (e.g., re-circularizing) the tubing 22 of the pipe segment 20, for example, to facilitate properly aligning the pipe segment tubing 22 with a corresponding tubing opening 96 and, thus, a container seal 98 attached along an edge of the tubing opening 96.

In any case, as described above, the hardening material 80 in a test head assembly 44 may then be solidified (e.g., cured and/or hardened) to produce solid hardening material 80 that encases the end of a pipe segment 20 disposed within its end container 74, thereby implementing a hardening material annulus seal 78 that facilitates sealing an open end of the tubing annulus 25 of the pipe segment 20 (process block 130). Additionally, as described above, the solid hardening material 80 may bond to the tubing 22 of the pipe segment 20 and, thus, facilitate securing the test head assembly 44 to the pipe segment 20. In fact, as described above, to facilitate improving securement strength, in some embodiments, the tubing 22 of a pipe segment 20 may be scored (e.g., roughed up) or otherwise contoured, for example, before the pipe segment tubing 22 is inserted into a corresponding end container 74 (process block 119).

In addition to being implemented within its end container 74, as described above, to facilitate improving sealing integrity, in some embodiments, a hardening material annulus seal 78 of a test head assembly 44 may be partially implemented within the tubing annulus 25 of a corresponding pipe segment 20 (process block 132). Thus, in such embodiments, fluid hardening material 80 may be flowed into the tubing annulus 25 of the pipe segment 20. As described above, to facilitate flowing fluid hardening material 80 into the tubing annulus 25 of a pipe segment 20, in some embodiments, air may be injected into the end container 74 of the test head assembly 44 behind the fluid hardening material 80, for example, via an injection port 106 on a lid 104 of the end container 74 (process block 134).

Additionally, as described above, to facilitate controlling the distance fluid hardening material 80 travels into the tubing annulus 25 of a pipe segment 20 and, thus, the amount a resulting hardening material annulus seal 78 is implemented within the tubing annulus 25, in some embodiments, a test head assembly 44 may include a depth check opening 108, which is formed through the outer barrier layer 28 of the pipe segment 20 to the tubing annulus 25 of the pipe segment 20. In other words, in such embodiments, deploying a test head assembly 44 at a pipe segment 20 may include forming a depth check opening 108 through the outer barrier layer 28 of the pipe segment 20 to the tubing annulus 25 of the pipe segment 20, for example, via a drill (process block 120). In particular, as described above, the depth check opening 108 may be formed at a target depth of a hardening material annulus seal 78. Thus, in such embodiments, a test head assembly 44 may be deployed at a pipe segment 20 at least in part by ceasing supply of fluid hardening material 80 and/or injection of air into the end container 74 once fluid hardening material 80 reaches its depth check opening 108.

In any case, as described above, a test head assembly 44 in a testing system 38 may additionally include one or more fluid ports 88, which are each implemented to be fluidly connected to the tubing annulus 25 of a corresponding pipe segment 20 to enable fluid flow into and/or out from the tubing annulus 25 of the pipe segment 20. As such, deploying a test head assembly 44 at a pipe segment 20 may generally include fluidly connecting a fluid port 88 to the tubing annulus 25 of the pipe segment 20 (process block 116).

In particular, as described above, in some embodiments, a fluid port 88 of a test head assembly 44 may be fluidly connected to the tubing annulus 25 of a pipe segment 20 via an annulus tube 111, which is inserted into the tubing annulus 25 and embedded within the hardening material annulus seal 78 of the test head assembly 44. In other words, in such embodiments, deploying a test head assembly 44 at a pipe segment 20 may generally include inserting an annulus tube 111 into the tubing annulus 25 of the pipe segment 20, for example, such that the annulus tube 111 extends beyond a depth check opening 108 formed in the pipe segment 20 (process block 122). Additionally, to facilitate embedding the annulus tube 111 in the hardening material annulus seal 78, in such embodiments, implementing the hardening material annulus seal 78 may include flowing fluid hardening material 80 around the annulus tube 111 (process block 137). Furthermore, in such embodiments, fluidly connecting the fluid port 88 to the tubing annulus 25 of the pipe segment 20 may include securing (e.g., clamping and/or welding) the fluid port 88 to the annulus tube 111 (process block 139).

However, as described above, a fluid port 88 of a test head assembly 44 may alternatively be fluidly connected to the tubing annulus 25 of a pipe segment 20 via an annulus test opening 76, which is formed through the outer barrier layer 28 of the pipe segment 20 to the tubing annulus 25 of the pipe segment 20. In other words, in such embodiments, deploying a test head assembly 44 at a pipe segment 20 may generally include forming an annulus test opening 76 through the outer barrier layer 28 of the pipe segment 20 to the tubing annulus 25 of the pipe segment 20, for example, via a drill (process block 124). Additionally, in such embodiments, fluidly connecting the fluid port 88 to the tubing annulus 25 of the pipe segment 20 may include securing (e.g., clamping and/or welding) the fluid port 88 over the annulus test opening 76 (process block 141).

In any case, as described above, to facilitate further securing its hardening material 80 and its end container 74 to the tubing 22 of a pipe segment 20, in some embodiments, a test head assembly 44 may additionally include one or more straps (e.g., chains) 85, which are implemented to be wrapped around the pipe segment tubing 22 and secured to a pad eye 83 in the test head assembly 44. In other words, in such embodiments, deploying a test head assembly 44 at a pipe segment 20 may include securing one or more straps 85, which are wrapped around the tubing 22 of the pipe segment 20, to a pad eye 83 in the test head assembly 44 (process block 125). In particular, as described above, in some such embodiments, a pad eye 83 in a test head assembly 44 may be integrated with its end container 74.

However, as described above, in other such embodiments, a pad eye 83 in a test head assembly 44 may be a discrete (e.g., separate) component, which is implemented to be embedded within hardening material 80 of the test head assembly 44. In other words, in such embodiments, implementing the hardening material annulus seal 78 of a test head assembly 44 may include flowing fluid hardening material 80 around a pad eye 83 (process block 143). In any case, in this manner, a test head assembly 44 in a testing system 38 may be deployed at a pipe segment 20 to facilitate testing the integrity of the pipe segment 20 at least in part by sealing the tubing annulus 25 of the pipe segment 20 from conditions external to the tubing 22 of the pipe segment 20 while enabling test fluid to flow into and/or out from the tubing annulus 25 of the pipe segment 20.

Figure 12:
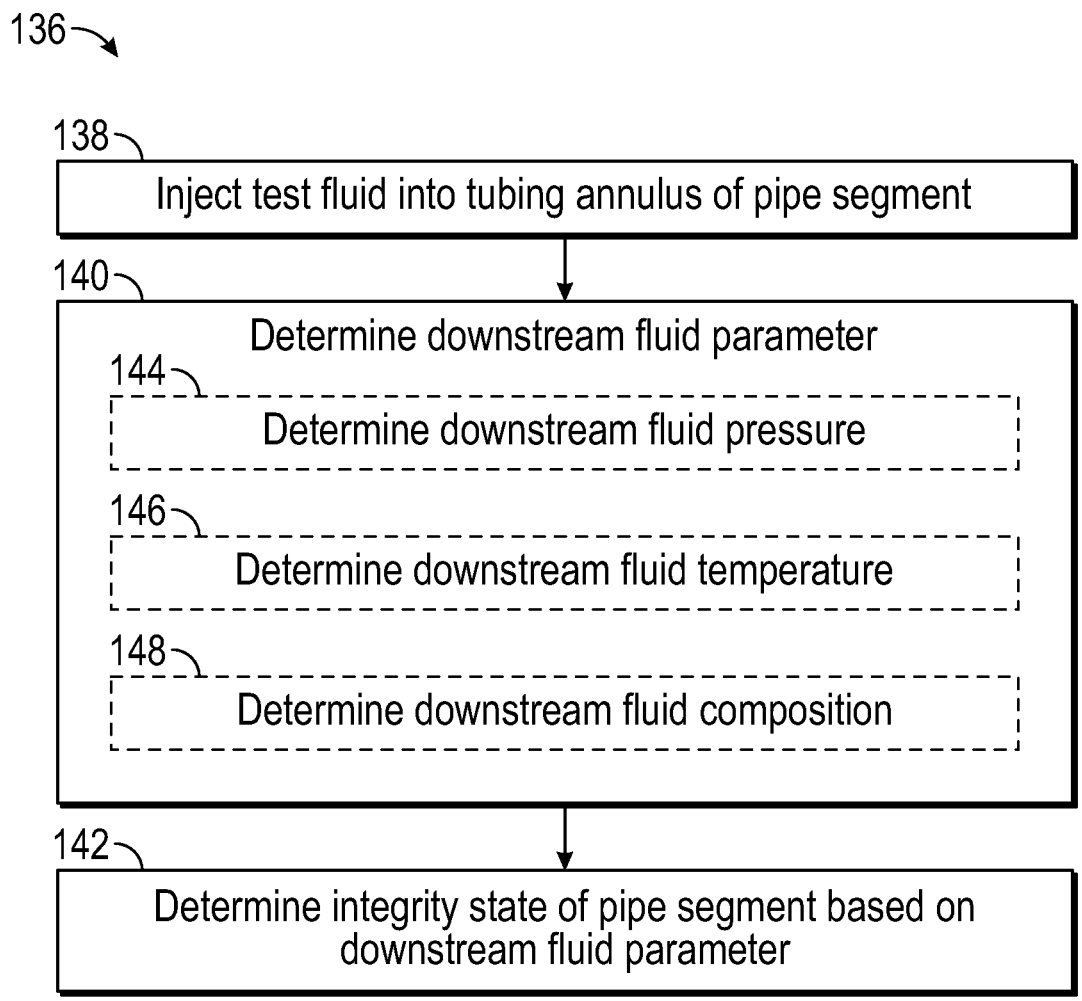
FIG. 12 is a flow diagram of an example of a process for testing integrity of a pipe segment using the testing system of FIG. 4, in accordance with an embodiment of the present disclosure.

Returning to the process 62 of FIG. 5, after the test head assembly 44 is deployed at a pipe segment 20, the testing system 38 may perform an integrity test on the pipe segment 20 (process block 66). To help illustrate, an example of a process 136 for performing an integrity test on a pipe segment 20 is described in FIG. 12. Generally, the process 136 includes injecting test fluid into a tubing annulus of a pipe segment (process block 138), determining a downstream fluid parameter (process block 140), and determining an integrity state of the pipe segment based on the downstream fluid parameter (process block 142).

Although described in a specific order, which corresponds with an embodiment of the present disclosure, it should be appreciated that the example process 136 is merely intended to be illustrative and not limiting. In particular, in other embodiments, a process 136 for performing an integrity test on a pipe segment 20 may include one or more additional process blocks and/or omit one or more of the depicted process blocks. Moreover, in some embodiments, the process 136 may be performed at least in part by executing instructions stored in one or more tangible, non-transitory, computer-readable media, such as memory 52 in a control sub-system 40, using processing circuitry, such as a processor 50 in the control sub-system 40.

For example, in some such embodiments, a control sub-system 40 in a testing system 38 may instruct the testing system 38 to inject test fluid (e.g., gas and/or liquid) into free space (e.g., one or more fluid conduits 24) defined within the tubing annulus 25 of a pipe segment 20 at which a test head assembly 44 of the testing system 38 is deployed (process block 138). As described above, an annulus test opening 76 in a test head assembly 44 may be formed through the outer barrier layer 28 of a pipe segment 20 to the tubing annulus 25 of the pipe segment 20. Thus, to inject test fluid into the tubing annulus 25, in such embodiments, the control sub-system 40 may selectively instruct a test fluid source 42, which is fluidly connected to the annulus test opening 76 via an external fluid conduit 60 (e.g., and a fluid port 88 on a saddle clamp 82), to supply (e.g., pump and/or flow) the test fluid to the annulus test opening 76, for example, via one or more control signals 58. Nevertheless, in some embodiments, an operator (e.g., user and/or service technician) of the testing system 38 may additionally or alternatively manually control injection of the test fluid, for example, by selectively turning on a test fluid pump and/or adjusting valve position of a value fluidly coupled to the annulus test opening 76.

Moreover, as described above, in some embodiments, the test fluid may be an inert fluid, such as nitrogen (e.g., $N_2$) gas, for example, to facilitate reducing the likelihood that the test fluid itself affects (e.g., reduces) integrity of pipe segment tubing 22. In any case, as will be described in more detail below, the integrity state of a pipe segment 20 may be determined based at least in part on one or more fluid parameters, such as temperature, pressure, and/or composition, of the test fluid. In some embodiments, one or more fluid parameters of the test fluid may be pre-determined, for example, offline by a test lab and/or a fluid supplier and stored in memory 52 of the testing system 38. Additionally or alternatively, one or more fluid parameters of the test fluid may be determined while the test fluid is being supplied to the free space defined within the tubing annulus 25 of a pipe segment 20, for example, online and/or in real-time via one or more fluid parameter sensors 43.

The testing system 38 may then determine one or more downstream fluid parameters that result from injection of the test fluid into the tubing annulus 25 of the pipe segment 20 (process block 140). As described above, in some embodiments, the one or more downstream fluid parameters may include a downstream fluid pressure determined (e.g., measured and/or sensed) by a pressure sensor 43, and/or a downstream fluid composition determined by a fluid composition sensor 43. Thus, in such embodiments, determining the one or more downstream fluid parameters may include determining a downstream fluid pressure (process block 144), determining a downstream fluid temperature (process block 146), determining a downstream fluid composition (process block 148), or any combination thereof, for example, based at least in part on corresponding sensor signals 56 received from one or more fluid parameter sensors 43.

Based at least in part on the one or more downstream fluid parameters, the testing system 38 may then determine an integrity state of the pipe segment 20 (process block 142). As described above, the tubing 22 of a pipe segment 20 is generally implemented to facilitate isolating (e.g., insulating) conditions internal to the pipe segment 20 from environmental conditions external to the pipe segment 20. Generally, when a fault is not present in its tubing 22, one or more parameters (e.g., characteristics and/or properties) of fluid flowing through a pipe segment 20 may nevertheless change as it flows therethrough. However, a fluid parameter change resulting from fluid flow through a pipe segment 20 with non-faulty tubing 22 is generally predictable, for example, based at least in part on a model, empirical testing, environmental conditions external to the pipe segment 20, fluid parameters of fluid input (e.g., supplied) to the pipe segment 20, implementation parameters, such as material and/or thickness, of the pipe segment tubing 22, or any combination thereof.

In other words, at least in some instances, an actual fluid parameter change that differs (e.g., deviates) from a corresponding expected (e.g., predicted) fluid parameter change may be indicative of a fault being present in the tubing 22 of a pipe segment 20 that produced the actual fluid parameter change. For example, an actual fluid pressure change (e.g., drop) that differs from an expected fluid pressure change may be indicative of fluid leaking from the tubing annulus 25 of the pipe segment 20 and, thus, that the tubing 22 of the pipe segment 20 is potentially faulty. Additionally, an actual fluid composition change that differs from an expected fluid composition change may be indicative of conditions external to the tubing 22 of the pipe segment 20 contaminating the conditions in the tubing annulus 25 of the pipe segment 20 and, thus, that the pipe segment tubing 22 is potentially faulty.

To determine an actual fluid parameter change, the testing system 38 may compare a downstream fluid parameter with a corresponding fluid parameter of the test fluid. For example, the testing system 38 may determine an actual fluid pressure change at least in part by comparing the downstream fluid pressure with the fluid pressure of the test fluid. Additionally, the testing system 38 may determine an actual fluid composition change at least in part by comparing the downstream fluid composition with the fluid composition of the test fluid.

In some embodiments, the testing system 38 may identify that the integrity state of the pipe segment 20 is a non-faulty state when each of the actual fluid parameter changes does not differ from a corresponding expected fluid parameter change, for example, by more than an error threshold that facilitates accounting for sensor (e.g., measurement) error. On the other hand, the testing system 38 may identify that the integrity state of the pipe segment tubing 22 is a faulty state when one or more of the actual fluid parameter changes differs from a corresponding expected (e.g., predicted) fluid parameter change, for example, by more than a corresponding error threshold. Moreover, when the integrity state is a faulty state, in some embodiments, the testing system 38 may identify an expected type and/or an expected location of one or more faults in the tubing 22 of the pipe segment 20, for example, based at least in part on where the downstream fluid parameters are sensed and/or how an actual fluid parameter change deviates from a corresponding expected fluid parameter change. In this manner, a testing system 38 may be operated to perform a cycle of an integrity test on a pipe segment 20.

Returning to the process 62 of FIG. 5, the testing system 38 may then determine whether the pipe segment 20 being tested has passed the integrity test (decision block 68). In particular, the testing system 38 may determine that the pipe segment 20 has passed when the integrity test determines that the integrity state of its tubing 22 is a non-faulty state. On the other hand, the testing system 38 may determine that the pipe segment 20 has not passed when the integrity test determines that the integrity state of its tubing 22 is a faulty state.

To facilitate improving operational reliability of a pipeline system 10 in which the pipe segment 20 is or is to be deployed, when the pipe segment 20 has not passed the integrity test, one or more faults in its tubing 22 may be ameliorated (e.g., fixed and/or repaired), for example, by a user (e.g., operator and/or service technician) of the testing system 38 based at least in part on results of the integrity test before the pipe segment 20 (process block 70). To facilitate communicating results of the integrity test to a user, in some embodiments, the testing system 38 may instruct an I/O device 54, such as an electronic display, to display a graphical user interface (GUI) that provides a visual representation of the integrity test results. For example, the graphical user interface may include a visual representation of the integrity state of the pipe segment 20, an expected type of fault present in the tubing 22 of the pipe segment 20, and/or an expected location of a fault in the tubing 22 of the pipe segment 20. In fact, in some embodiments, another cycle of the integrity test may be performed on the pipe segment 20 once a fault in its tubing 22 is believed to have been ameliorated (arrow 150).

On the other hand, when the pipe segment 20 has passed the integrity test, the test head assembly 44 may be cut off from the pipe segment 20 (process block 72). A pipe fitting 18 may then be connected to the pipe segment 20 to enable the pipe segment 20 to be used in normal operation of the pipeline system 10. In this manner, the present disclosure provides techniques for implementing and/or deploying a test head assembly to facilitate testing integrity of one or more pipe segments deployed or to be deployed in a pipeline system, which, at least in some instances, may facilitate improving operational reliability of the pipeline system, for example, at least in part by enabling a fault in the pipeline system to be ameliorated (e.g., fixed and/or repaired) before the pipeline system begins and/or resumes normal operation.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A system comprising:
    a pipe segment, wherein the pipe segment comprises tubing that defines a pipe bore through the pipe segment and a fluid conduit in a tubing annulus of the pipe segment; and
    a test head assembly secured to the pipe segment, wherein the test head assembly comprises:
        an end container, wherein an end of the tubing of the pipe segment is disposed within the end container;
        an annulus seal implemented at least in part by solidifying fluid hardening material that is flowed into the end container to facilitate securing the test head assembly to the pipe segment and sealing an opening end of the tubing annulus of the pipe segment within the test head assembly; and
        a fluid port fluidly connected to the fluid conduit in the tubing annulus of the pipe segment to enable integrity of the tubing to be tested at least in part by flowing a test fluid into the fluid conduit via the fluid port, extracting fluid from the fluid conduit via the fluid port, or both.

2. The system of claim 1, wherein the fluid hardening material flowed into the end container of the test head assembly comprises liquid epoxy, molten metal, liquid cement, liquid adhesive, spray foam, liquid elastomer, or liquid polymer.

3. The system of claim 1, wherein:
    the tubing of the pipe segment comprises a depth check opening formed through an outer barrier layer of the pipe segment to the tubing annulus of the pipe segment; and
    the annulus seal of the test head assembly extends into the tubing annulus of the pipe segment at least up to the depth check opening.

4. The system of claim 1, wherein the end container of the test head assembly comprises an injection port that enables air to be injected into the end container behind the fluid hardening material to facilitate implementing the annulus seal of the test head assembly partially within the tubing annulus of the pipe segment.

5. The system of claim 1, wherein:
    the tubing of the pipe segment comprises an annulus test opening formed through an outer barrier layer of the pipe segment to the tubing annulus of the pipe segment; and
    the fluid port of the test head assembly is secured over the annulus test opening.

6. The system of claim 5, wherein the fluid port of the test head assembly is secured over the annulus test opening in the pipe segment via clamp segments secured circumferentially around the tubing of the pipe segment.

7. The system of claim 1, wherein the test head assembly comprises a bore plug partially inserted into the pipe bore of the pipe segment to facilitate blocking the fluid hardening material from flowing into the pipe bore.

8. The system of claim 7, wherein the end container of the test head assembly comprises:
    a sidewall with a tubing opening that enables the tubing of the pipe segment to be inserted into the end container; and
    a container seal attached to the sidewall along an edge of the tubing opening to facilitate blocking the fluid hardening material from inadvertently leaking out of the end container at least in part by engaging the tubing of the pipe segment.

9. The system of claim 1, wherein the end container of the test head assembly is donut-shaped with a hollow core.

10. The system of claim 9, wherein the end container of the test head assembly comprises:
    a sidewall with a tubing opening that enables the tubing of the pipe segment to be inserted into the end container;
    an outer container seal attached along an outer edge of the tubing opening to engage an outer surface of the tubing of the pipe segment; and
    an inner container seal attached along an inner edge of the tubing opening to engage an inner surface of the tubing of the pipe segment.

11. The system of claim 1, wherein:
    the test head assembly comprises an annulus tube embedded within the annulus seal such that a first end of the annulus tube extends through the annulus seal into the tubing annulus of the pipe segment; and
    the fluid port is secured to a second end of the annulus tube.

12. A method of deploying a test head assembly at a pipe segment, comprising:
- inserting an end of the pipe segment into an end container of the test head assembly via a tubing opening formed through a sidewall of the end container;
- flowing fluid hardening material into the end container of the test head assembly such that the fluid hardening material flows into a tubing annulus of the pipe segment;
- solidifying the fluid hardening material to implement a hardening material annulus seal that encases and is bonded to the end of the pipe segment to facilitate securing the test head assembly to the pipe segment and sealing an open end of the tubing annulus of the pipe segment within the test head assembly; and
- fluidly connecting a fluid port of the test head assembly to the tubing annulus of the pipe segment to enable integrity of the pipe segment to be tested at least in part by flowing a test fluid into the tubing annulus of the pipe segment via the fluid port, extracting fluid from the tubing annulus of the pipe segment via the fluid port, or both.

13. The method of claim 12, wherein fluidly connecting the fluid port of the test head assembly to the tubing annulus of the pipe segment comprises:
- forming an annulus test opening through an outer barrier layer of the pipe segment to the tubing annulus of the pipe segment; and
- securing the fluid port over the annulus test opening in the pipe segment.

14. The method of claim 12, wherein:
- fluidly connecting the fluid port of the test head assembly to the tubing annulus of the pipe segment comprises inserting a first end of an annulus tube into the tubing annulus of the pipe segment and securing the fluid port to a second end of the annulus tube; and
- flowing the fluid hardening material into the end container comprises flowing the fluid hardening material around the annulus tube to facilitate embedding the annulus tube within the hardening material annulus seal of the test head assembly.

15. The method of claim 12, comprising forming a depth check opening through an outer barrier layer of the pipe segment to the tubing annulus of the pipe segment, wherein flowing the fluid hardening material into the end container comprises flowing the fluid hardening material into the end container until the fluid hardening material reaches the depth check opening in the pipe segment.

16. The method of claim 12, comprising inserting a bore plug into a pipe bore of the pipe segment to facilitate blocking the fluid hardening material from flowing into the pipe bore of the pipe segment.

17. The method of claim 12, wherein inserting the end of the pipe segment into the end container comprises:
- engaging an outer surface of the tubing of the pipe segment with an outer container seal attached along an outer edge of the tubing opening in the end container; and
- engaging an inner surface of the tubing of the pipe segment with an inner container seal attached along an inner edge of the tubing opening formed through the sidewall of the end container.

18. A test head assembly comprising:
an end container, wherein:
- the end container comprises a sidewall with a tubing opening that is configured to enable an end of a pipe segment to be inserted into the end container; and
- the end container is configured to enable fluid hardening material to be disposed therein to implement a hardening material annulus seal that facilitates securing the test head assembly to the pipe segment and sealing an open end of a tubing annulus of the pipe segment within the test head assembly; and a fluid port configured to be fluidly connected to the tubing annulus of the pipe segment to enable integrity of the pipe segment to be tested at least in part by flowing a test fluid into the tubing annulus of the pipe segment via the fluid port, extracting fluid from the tubing annulus of the pipe segment via the fluid port, or both.

19. The test head assembly of claim 18, comprising:
an annulus tube configured to be inserted into the tubing annulus of the pipe segment, embedded within the hardening material annulus seal, and secured to the fluid port; or
an annulus test opening formed through an outer barrier layer of the pipe segment to the tubing annulus of the pipe segment, wherein the fluid port is configured to be secured over the annulus test opening.

20. The test head assembly of claim 18, wherein the end container of the test head assembly is donut-shaped or the test head assembly comprises a bore plug configured to be inserted into a pipe bore of the pipe segment to facilitate blocking the fluid hardening material from flowing into the pipe bore of the pipe segment.

* * * * *